(12) United States Patent
Staels

(10) Patent No.: US 11,560,077 B2
(45) Date of Patent: Jan. 24, 2023

(54) SUPPORT STRUCTURE, APPARATUS AND METHOD

(71) Applicant: Staels Design Ltd, Scotland (GB)

(72) Inventor: Corien Staels, Glasgow Strathclyde (GB)

(73) Assignee: Staels Design Ltd., Glasgow (GB)

( * ) Notice: Subject to any disclaimer, the term of this patent is extended or adjusted under 35 U.S.C. 154(b) by 541 days.

(21) Appl. No.: 16/498,513

(22) PCT Filed: Mar. 28, 2018

(86) PCT No.: PCT/GB2018/050848
§ 371 (c)(1),
(2) Date: Sep. 27, 2019

(87) PCT Pub. No.: WO2018/178694
PCT Pub. Date: Oct. 4, 2018

(65) Prior Publication Data
US 2020/0113343 A1    Apr. 16, 2020

(30) Foreign Application Priority Data

Mar. 28, 2017 (GB) ...................................... 1704975
Nov. 1, 2017 (GB) ...................................... 1718115

(51) Int. Cl.
*B60N 2/56* (2006.01)
*A61G 5/10* (2006.01)
(Continued)

(52) U.S. Cl.
CPC ............ *B60N 2/5621* (2013.01); *A47C 7/742* (2013.01); *A47C 21/04* (2013.01); *A61G 5/1045* (2016.11);
(Continued)

(58) Field of Classification Search
CPC .. B60N 2/5621; B60N 2/5642; B60N 2/5657; B60N 2/56; A47C 7/742; A47C 21/04;
(Continued)

(56) References Cited

U.S. PATENT DOCUMENTS 7,419,209 B1   9/2008   Mangiapane et al.
7,708,338 B2   5/2010   Wolas
(Continued)

FOREIGN PATENT DOCUMENTS

CN        2663207 Y     12/2004
CN        1856417       11/2006
(Continued)

OTHER PUBLICATIONS

China National Intellectual Property Administration, Examination report in CN201880031123.8, dated Jul. 30, 2021.
(Continued)

*Primary Examiner* — Mark R Wendell
(74) *Attorney, Agent, or Firm* — Dorton & Willis, LLP; Ryan Willis

(57) ABSTRACT

A support structure for supporting the user of a mobility device or the like, the support structure comprising a fluid flow channel, the fluid flow channel comprising a fluid inlet and a fluid outlet, wherein at least part of the fluid flow channel is tapered, the at least part tapered fluid flow channel comprising a first end and a second end, the first end of the at least part tapered fluid flow channel being located proximal to the fluid inlet and the second end of the at least part tapered fluid flow channel being located distal to the fluid inlet, and wherein the width of the second end of the at least part tapered fluid flow channel is greater than the width of the first end of the at least part tapered fluid flow channel.

19 Claims, 17 Drawing Sheets

(51) Int. Cl.
*A47C 21/04* (2006.01)
*A47C 7/74* (2006.01)

(52) U.S. Cl.
CPC .......... *A61G 5/1048* (2016.11); *B60N 2/5642* (2013.01); *B60N 2/5657* (2013.01); *A61G 2203/70* (2013.01); *B60N 2/56* (2013.01)

(58) Field of Classification Search
CPC . A61G 5/1048; A61G 5/1045; A61G 2203/70
USPC ...................................................... 297/180.1
See application file for complete search history.

(56) References Cited

U.S. PATENT DOCUMENTS

| | | | |
|---|---|---|---|
| 9,126,515 B2* | 9/2015 | Diop | B60N 2/914 |
| 9,688,174 B2* | 6/2017 | Dry | B60N 2/5816 |
| 2006/0290175 A1 | 12/2006 | Hartwich | |
| 2008/0296075 A1 | 12/2008 | Zhu et al. | |
| 2011/0109128 A1 | 5/2011 | Axakov et al. | |
| 2011/0260509 A1 | 10/2011 | Siu | |
| 2012/0080911 A1 | 4/2012 | Brykalski | |

FOREIGN PATENT DOCUMENTS

| | | |
|---|---|---|
| CN | 202086064 | 12/2011 |
| CN | 103492226 | 1/2014 |
| CN | 205273238 | 6/2016 |
| DE | 102013020799 A1 | 7/2014 |
| EP | 08344220 A1 | 4/1998 |
| EP | 1972217 A1 | 9/2008 |
| EP | 3067232 A1 | 9/2016 |
| GB | 1704975.0 | 9/2017 |
| JP | 4-92607 | 3/1992 |
| JP | H-0828797 A1 | 2/1996 |
| JP | 2006-524159 | 10/2006 |
| JP | 2007-215695 | 8/2007 |
| WO | PCT/GB2018/050848 | 7/2018 |
| WO | PCT/GB2018/050848 | 5/2019 |
| WO | PCT/GB2018/050848 | 7/2019 |

OTHER PUBLICATIONS

Japan Patent Office, Notice of Reasons for Refusal in Japanese Patent Application No. 2020-503375, dated May 24, 2022.

* cited by examiner

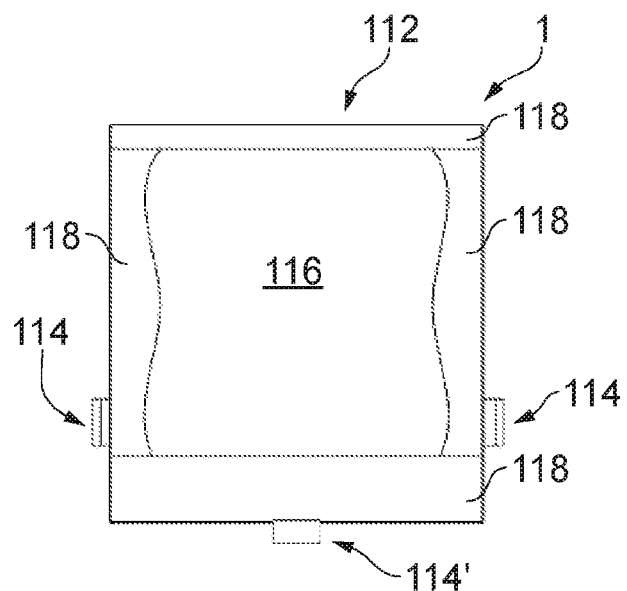
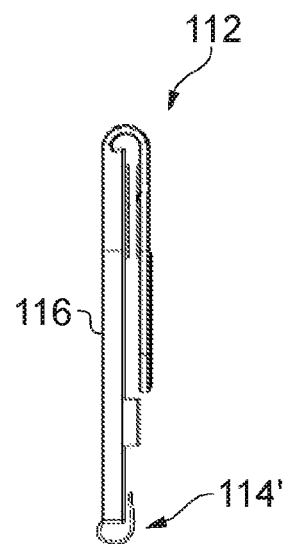
FIG. 8a  FIG. 8b
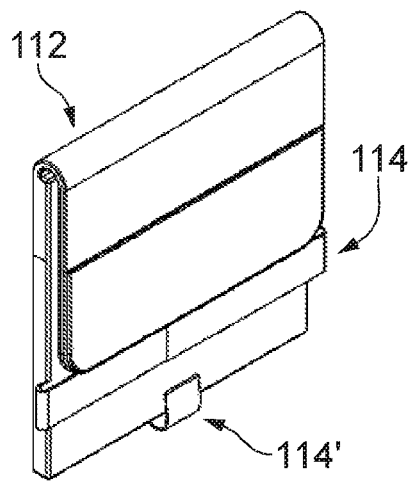
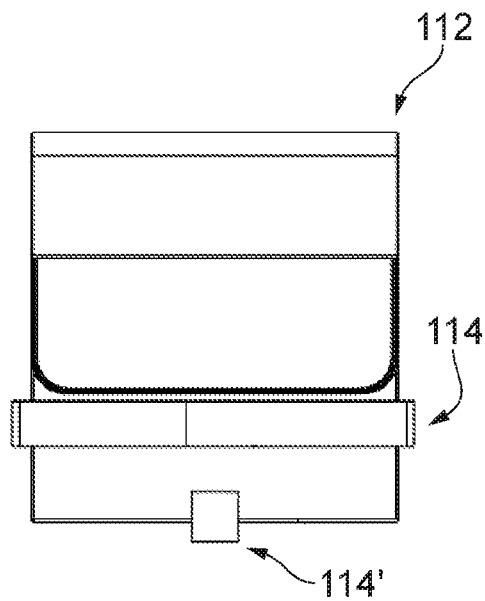
FIG. 8c  FIG. 8d

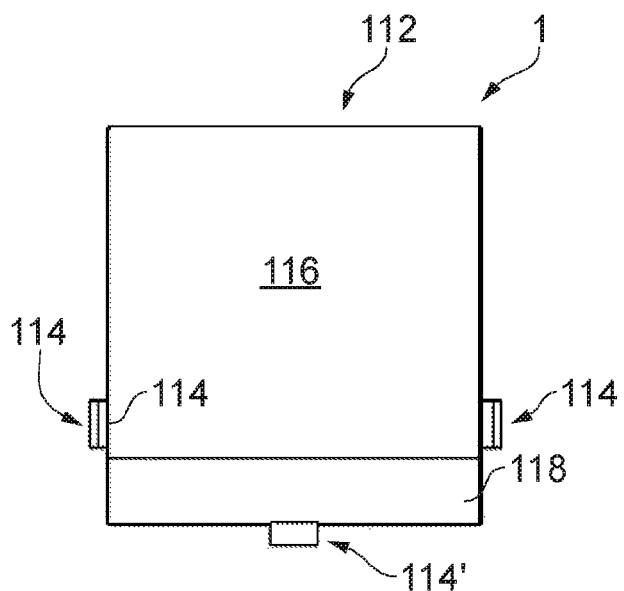
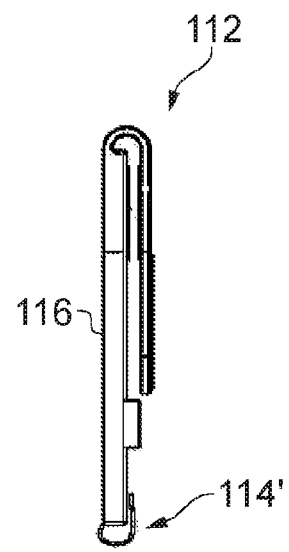
FIG. 9a  FIG. 9b
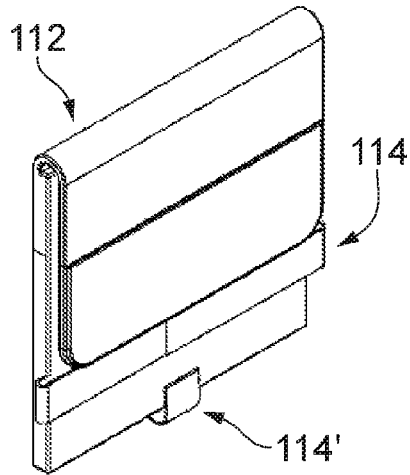
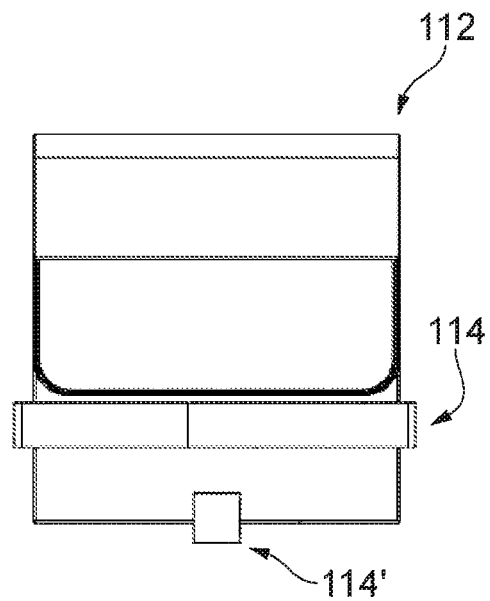
FIG. 9c  FIG. 9d

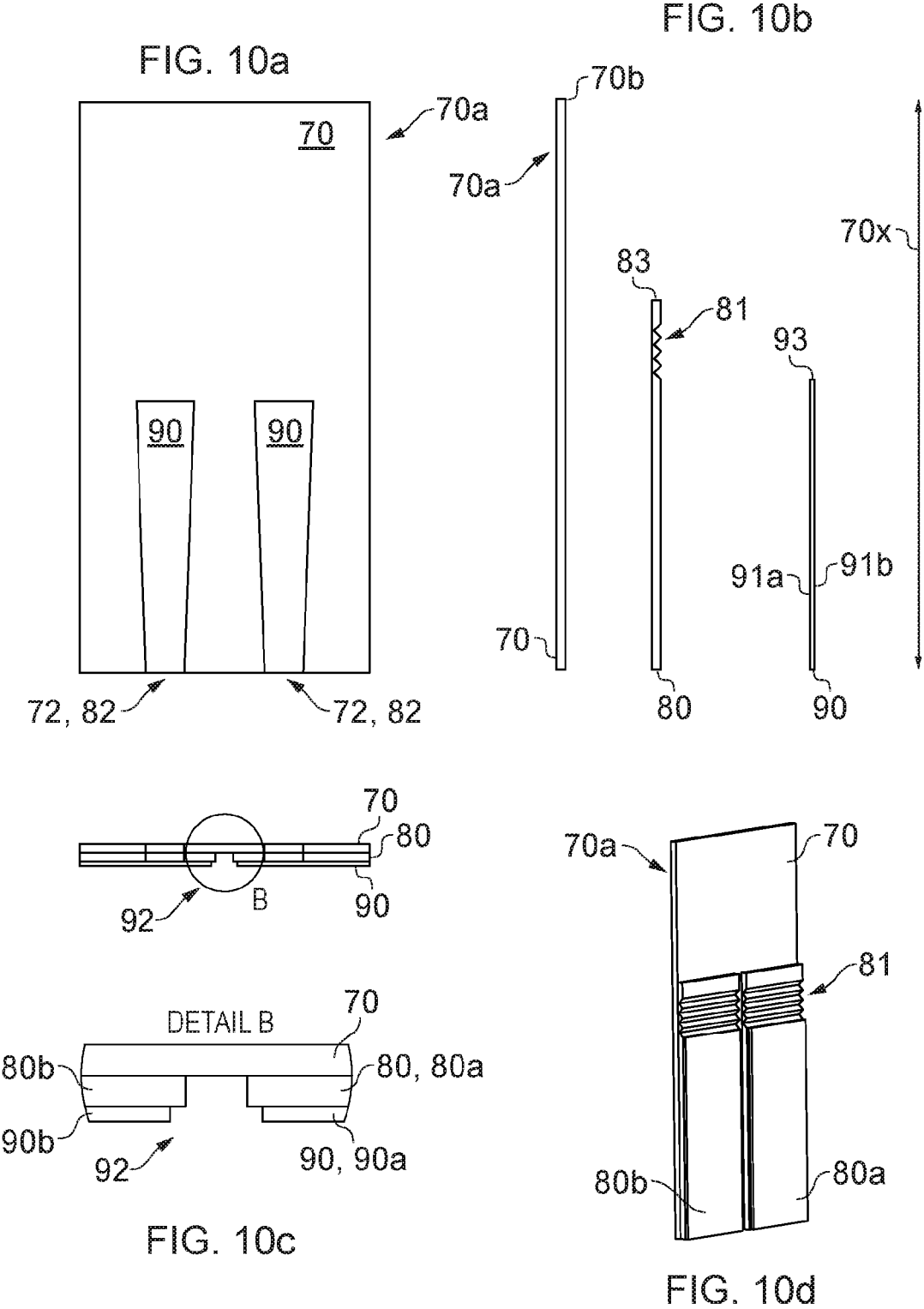

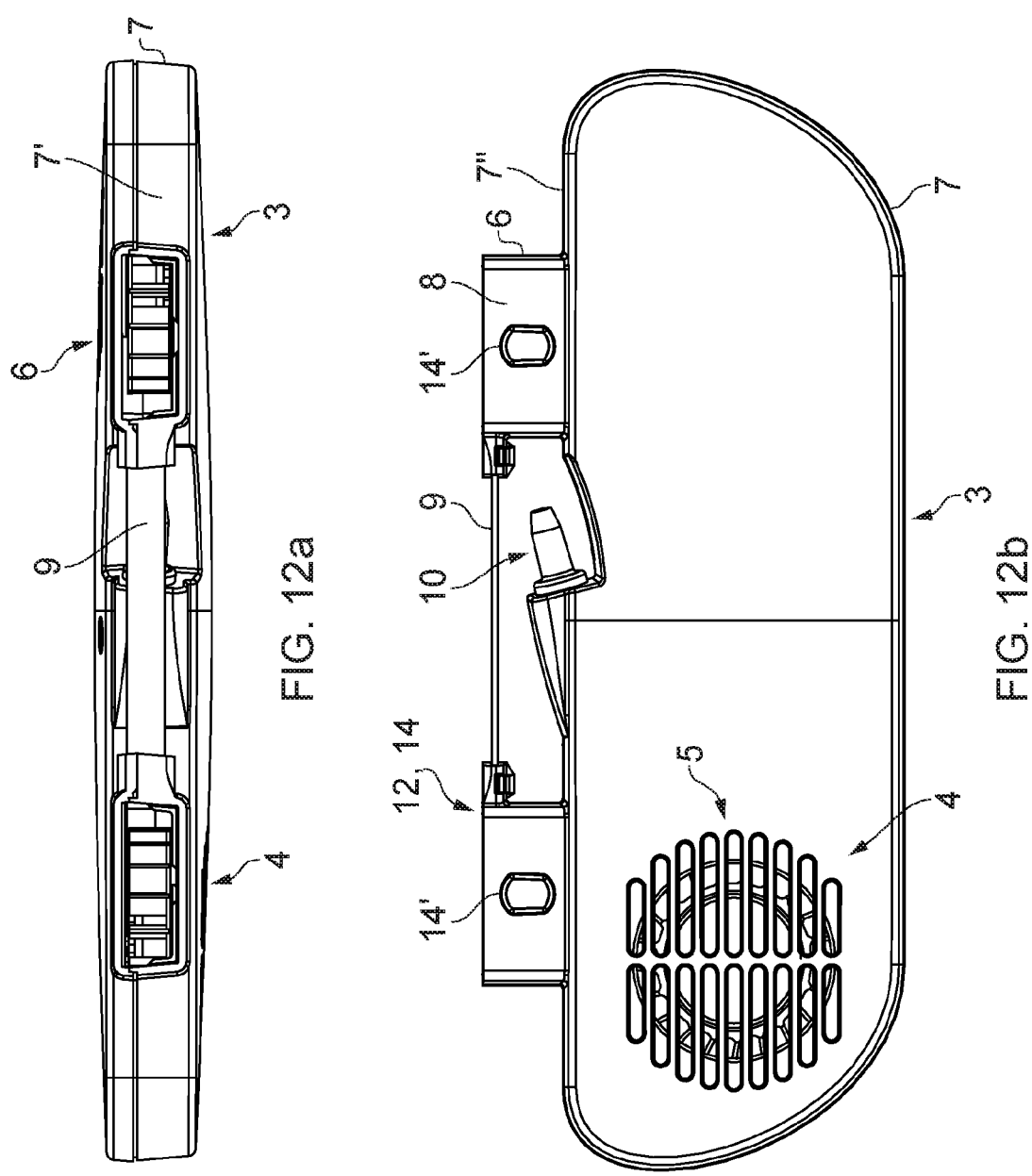

SUPPORT STRUCTURE, APPARATUS AND METHOD

This application is a national stage of PCT/GB2018/050848, filed Mar. 28, 2018, which claimed priority to Great Britain patent application number 1704975.0, filed Mar. 28, 2017, and claimed priority to Great Britain patent application number 1718115.7, filed Nov. 1, 2017, all of which are incorporated herein by reference.

FIELD OF THE INVENTION

This invention relates to a support structure and particularly, but not exclusively, an apparatus for providing air to a support structure for supporting the body of a user, particularly a user of a mobility device or the like. The invention also relates to an apparatus for controlling the temperature of a support structure for supporting the body of a user, a method of providing fluid to the user of a mobility device, or the like, and a method of dispersing fluid.

BACKGROUND TO THE INVENTION

Users of mobility devices are known to experience discomfort due to the build-up of heat and moisture, which can also lead to pressure sores and skin atrophy in some cases. Known apparatuses and systems for mitigating or preventing the build-up of heat and moisture have a number of disadvantages. For example, some apparatuses and systems in the prior art increase the flow rate of air provided to the user by way of a fan and an air outlet arrangement, the air outlet directed to a specific area of the back, for example. However, such arrangements cool only a small area of the user and, because the air outlet is concentrated on one area, often result in that area of the user becoming too cold, while other areas of the user remain too warm. Additionally, the sensation of air being provided to a small area of the user can be unpleasant and/or irritating, particularly when, for example, the flow rate of the air has been increased by way of a fan and an air outlet arrangement. Furthermore, known apparatuses and systems often fail to remove moisture from the person. These disadvantages can contribute to further discomfort for the user.

Therefore, there remains a need to address at least some of these problems. In particular, there is a desire to reduce the build-up of heat and moisture experienced by users of mobility devices.

Therefore, it is an object of the invention to obviate or mitigate at least some of the disadvantages of the prior art.

It is an object of the present invention to provide a support structure for reducing the build-up of heat and/or moisture experienced by a user of a mobility device. It is a further object of the invention to provide a method of reducing the build-up of heat and/or moisture experienced by a user of a mobility device.

The term "mobility device" used herein should be understood to include all types of personal mobility device, such as wheelchairs, mobility scooters, and the like.

SUMMARY OF THE INVENTION

According to a first aspect of the invention there is provided a support structure for supporting the user of a mobility device or the like, the support structure comprising:
 a fluid flow channel, the fluid flow channel comprising:
  a fluid inlet; and
  a fluid outlet;
 wherein at least part of the fluid flow channel is tapered, the at least part tapered fluid flow channel comprising a first end and a second end; the first end of the at least part tapered fluid flow channel being located proximal to the fluid inlet and the second end of the at least part tapered fluid flow channel being located distal to the fluid inlet; and
 wherein the width of the second end of the at least part tapered fluid flow channel is greater than the width of the first end of the at least part tapered fluid flow channel.

It will be appreciated that the at least part tapered fluid flow channel has at least a tapered part.

At least a part of the fluid flow channel may be flexible. The fluid flow channel may be flexible. The fluid flow channel may be a flexible member.

The support structure may be a cushion. The support structure may be a back rest cushion. The support structure may be a mobility device cushion. The support structure may be a wheelchair cushion. The support structure may be a wheelchair back rest cushion. The support structure may be a seat cushion. The support structure may be a mobility device seat cushion. The support structure may be a wheelchair seat cushion.

Substantially the whole of the fluid flow channel may be tapered. The maximum width of the at least part tapered fluid flow channel may be located at the second end of the at least part tapered fluid flow channel. The minimum width of the at least part tapered fluid flow channel may be located at the first end of the at least part tapered fluid flow channel.

The fluid flow channel may comprise sidewalls. The minimum separation distance between the sidewalls may be located at the first end of the at least part tapered fluid flow channel. The maximum separation distance between the sidewalls may be located at the second end of the at least part tapered fluid flow channel. The minimum separation distance between the sidewalls may be located at the first end of the at least part tapered fluid flow channel and the maximum separation distance between the sidewalls may be located at the second end of the at least part tapered fluid flow channel.

The depth of the first end of the at least part tapered fluid flow channel may be greater than the depth of the second end of the at least part tapered fluid flow channel.

The first end of the at least part tapered fluid flow channel may comprise a substantially rectangular cross section. The second end of the at least part tapered fluid flow channel may comprise a substantially rectangular cross section. The at least part tapered fluid flow channel may have a substantially rectangular cross section from the first end to the second end. The area of the cross section of the first end of the at least part tapered fluid flow channel may be greater than the area of the cross section of the second end of the at least part tapered fluid flow channel.

The fluid outlet may be formed from one or more apertures in the fluid flow channel. The fluid flow channel may comprise a top section. The top section of the fluid flow channel may comprise one or more apertures, the one or more apertures forming one or more fluid outlets. The top section of the fluid flow channel may comprise an open part, the open part of the top section of the fluid flow channel defining the fluid outlet. The top section may comprise a closed part and the closed part of the top section of the fluid flow channel may be located proximal to the fluid inlet. Substantially the whole of the top section of the fluid flow channel may be open, such that it forms the fluid outlet.

The fluid outlet may comprise a first end and a second end, the first end of the fluid outlet being located proximal to the fluid inlet and the second end of the fluid outlet being located distal to the fluid inlet, and the width of the second end of the fluid outlet may be greater than the width of the first end of the fluid outlet.

The fluid outlet may be substantially the same shape as the top surface of the at least part tapered fluid flow channel. The fluid outlet may be substantially the same shape as the at least part tapered fluid flow channel.

The fluid may be air.

The fluid flow channel may comprise one or more fins. The, or each, fin may be an elongate longitudinal member. The, or each, fin may be arranged substantially longitudinally from the first end of the at least part tapered fluid flow channel to the second end of the at least part tapered fluid flow channel.

The fins may be arranged in a tapered arrangement. Each fin may comprise a first end and a second end, the first end of each fin being located proximal to the fluid inlet and the second end of each fin being located distal to the fluid inlet, and the separation between the fins may be greater at the second end than at the first end.

The profile of the, or each, fin from proximal to the fluid inlet, to distal to the fluid inlet, may have an arcuate shape. The, or each, fin may be made from a resilient material such that the fins are configurable to provide support to the user.

The support structure may comprise a first support layer. The support structure may comprise a second support layer. The first support layer may be adjacent to the second support layer. At least one of the first support layer and the second support layer may comprise a fluid flow channel engagement section. At least one of the first support layer and the second support layer may comprise a fluid flow channel engagement section, the fluid flow channel engagement section being configured to engage with the at least part-tapered fluid flow channel. At least one of the first support layer and the second support layer may comprise a fluid flow channel engagement section, the fluid flow channel engagement section being configured to engage with the fluid flow channel.

At least one of the first support layer and the second support layer may substantially surround the fluid flow channel. At least a part of the fluid flow channel engagement section may be tapered. At least a portion of the fluid flow channel engagement section, and at least a portion of the fluid flow channel, may be arranged to be substantially co-planar.

At least a portion of the fluid flow channel engagement section, and at least a portion of the fluid outlet, may be arranged to be co-planar. The fluid flow channel engagement section may be substantially identical in shape to the fluid flow channel. The fluid flow channel engagement section may be substantially identical in shape to the fluid outlet.

The first support layer may be a substantially planar member. The first support layer may be a substantially rectangular planar member. The second support layer may be a substantially planar member. The second support layer may be a substantially rectangular planar member. At least one of the first support layer and the second support layer may be a substantially planar member.

The first support layer may be made from a resilient material. The second support layer may be made from a resilient material. At least one of the first support layer and the second support layer may be made from a resilient material.

The support structure may comprise a third support layer. The third support layer may be a substantially planar member. The third support layer may be a substantially rectangular planar member. The second support layer may be located between the first support layer and the third support layer.

The support structure may be configurable to be foldable by way of a flexible region. The third support layer may comprise at least two parts, the at least two parts being spaced apart to provide a gap therebetween. The second support layer may comprise at least two parts, the at least two parts being spaced apart to provide a gap therebetween. The gap between the at least two parts of the second support layer, and/or the gap between the at least two parts of the third support layer, may provide a flexible region.

The width of the gap between the at least two parts of the third support layer may be greater than the width of the gap between the at least two parts of the second support layer. The length of the first support layer may be greater than the length of the second support layer. The length of the first support layer may be greater than the length of the third support layer. The length of the second support layer may be greater than the length of the third support layer. The second support layer may be configured to be foldable by way of a flexible section of the second support layer. The length of the first support layer may be greater than the length of the second support layer and the length of the first support layer may be greater than the length of the third support layer, the first support layer being configured to be foldable such that at least an edge of the first support layer abuts the third support layer.

The first support layer may comprise a length of between approximately 300 mm and approximately 420 mm. The first support layer may comprise a width of between approximately 300 mm and approximately 420 mm. The first support layer may comprise a thickness of between approximately 5 mm and approximately 15 mm. The first support layer may comprise a length of between approximately 300 mm and approximately 770 mm.

The second support layer may comprise a length of between approximately 300 mm and approximately 420 mm. The second support layer may comprise a width of between approximately 300 mm and approximately 420 mm. The second support layer may comprise a thickness of between approximately 5 mm and approximately 15 mm. The second support layer may comprise a length of between approximately 300 mm and approximately 770 mm.

The third support layer may comprise a length of between approximately 300 mm and approximately 420 mm. The third support layer may comprise a width of between approximately 300 mm and approximately 420 mm. The third support layer may comprise a thickness of between approximately 3 mm and approximately 7 mm. The third support layer may comprise a length of between approximately 300 mm and approximately 770 mm.

The support structure may comprise a first fluid dispersion layer. The support structure may be arranged such that fluid can flow from the fluid outlet through the first fluid dispersion layer. The first fluid dispersion layer may be made from a fabric material.

At least part of the first fluid dispersion layer may be porous. At least part of the first fluid dispersion layer may be non-porous. The porous part of the first fluid dispersion layer may be configured to allow fluid to pass therethrough. The non-porous part of the first fluid dispersion layer may be configured to mitigate or prevent the flow of fluid.

The porous part of the first fluid dispersion layer and the fluid outlet may at least partially overlap. The width of the porous part of the first fluid dispersion layer may be greater than the width of the fluid outlet.

The length of the porous part of the first fluid dispersion layer may be greater than the length of the fluid outlet.

The porous part of the first fluid dispersion layer may be a high surface area to volume ratio structure. The porous part of the first fluid dispersion layer may be a mesh structure, or the like.

The non-porous part of the first fluid dispersion layer may be located on a lower region of the first fluid dispersion layer. The first fluid dispersion layer may be configured to substantially surround the support structure. The first fluid dispersion layer may be configured to substantially surround the fluid flow channel. The first fluid dispersion layer may be configured to substantially surround the first support layer. The first fluid dispersion layer may be configured to substantially surround the second support layer. The first fluid dispersion layer may be configured to substantially surround the third support layer. The first fluid dispersion layer may be configured to substantially surround the fluid flow channel and at least one of the first support layer, or the second support layer, or the third support layer. The first fluid dispersion layer may be a pouch, or the like. The support structure may comprise a second fluid dispersion layer. The second fluid dispersion layer may be configured to allow fluid from the first fluid dispersion layer to flow to the user.

At least part of the second fluid dispersion layer may be porous, and/or at least part of the second fluid dispersion layer may be non-porous. The porous part of the second fluid dispersion layer may be configured to allow the flow of fluid therethrough. The non-porous part of the second fluid dispersion layer may be configured to mitigate or prevent the flow of fluid.

The porous part of the second fluid dispersion layer and the porous part of the first fluid dispersion layer may at least partially overlap. The width of the porous part of the second fluid dispersion layer may be greater than the width of the fluid outlet. The length of the porous part of the second fluid dispersion layer may be greater than the length of the fluid outlet. The porous part of the second fluid dispersion layer may be a high surface area to volume ratio structure.

The porous part of the second fluid dispersion layer may be a mesh structure, or the like. The non-porous part of the second fluid dispersion layer may be located on a lower region of the second fluid dispersion layer. The non-porous part of the second fluid dispersion layer may be configured to substantially surround the porous part of the second fluid dispersion layer. The second fluid dispersion layer may be a pouch, or the like.

The support structure may comprise, or is configured to attach to, a fluid flow control apparatus. The fluid inlet may be connectable to the fluid flow control apparatus.

The fluid flow control apparatus may be a fan, or the like. The fluid flow control apparatus may be a pump, or the like.

The fluid flow control apparatus may be formed within a housing. The housing may comprise a fan inlet and a fan outlet. The fan outlet may be connected to the fluid inlet of the fluid flow channel.

The housing may comprise a pump inlet and a pump outlet. The pump outlet may be connected to the fluid inlet of the fluid flow channel. The pump inlet may be connected to a source of fluid.

The support structure may comprise a control module. The control module may be configured to control the fluid flow control apparatus.

The fluid flow control apparatus may comprise a battery. The battery may be a rechargeable battery. The battery may be a lithium ion battery.

The battery may be operable to provide a voltage of between approximately 2.5 Volts and approximately 4.2 Volts. The battery may be operable to provide a maximum current of approximately 3 Amperes. The battery may be operable to provide a voltage of between approximately 2.5 Volts and approximately 4.2 Volts and/or a maximum current of approximately 3 Amperes. The battery may have a capacity of between approximately 7000 mAh and approximately 9000 mAh. The battery may have a capacity of approximately 7800 mAh. The battery may provide electrical power to the control module and the fluid flow control apparatus.

In use, the battery may last for between approximately 3 hours and approximately 20 hours. In use, the battery may last for between approximately 3 hours and approximately 24 hours.

The fluid inlet may be connectable to the fluid flow control apparatus by way of an attachment mechanism. The attachment mechanism may be a snap fit connector, a friction fit connector, a clamp connector, or the like. There may be one or more, or a plurality of, fluid inlets. The, or each, fluid inlet may be connectable to the fluid flow control apparatus. The fluid inlet may have a substantially rectangular cross section.

The fluid outlet may comprise one or more, or a plurality of, apertures.

The support structure may comprise one or more, or a plurality of, fluid flow channels. The support structure may comprise two fluid flow channels. The fluid flow channels may be spaced substantially equidistantly.

The top section of the fluid flow channel may comprise one or more, or a plurality of, apertures. The sidewalls, of the fluid flow channel may comprise one or more, or a plurality of, apertures. The bottom section may comprise one or more, or a plurality of, apertures. The fluid outlet may be formed by one or more, or a plurality of, apertures in the top section, the sidewall or sidewalls, and/or in the bottom section. The top section of the fluid flow channel may comprise a porous membrane. The porous membrane may be a mesh structure.

The, or each, fin may be made from a resilient material. The, or each, fin may be made from a plastics material. The, or each, fin may be made from polyurethane. The, or each, fin may be made from an elastomer material. The, or each, fin may be made from a moulded elastomer. The, or each, fin may be made from a resilient material such that, in use, the weight of the user does not deform the fluid flow channel. The, or each, fin may be made from a resilient material such that, in use, the weight of the user does not obstruct the flow of fluid within the fluid flow channel.

The, or each, fin may comprise a first end and a second end. The first end of each fin may be located proximal to the fluid inlet. The second end of each fin may be located distal to the fluid inlet. The separation between the fins may be greater at the second end than at the first end. In this arrangement, the fins are tapered. In this arrangement, obstruction of the flow of fluid from the fluid inlet to the fluid outlet is minimised.

At least a part of the sidewalls of the fluid flow channel may be substantially planar. The sidewalls of the fluid flow channel may be substantially planar members. The sidewalls of the fluid flow channel may be elongate members. The sidewalls of the fluid flow channel may be elongate planar members. Without wishing to be bound by theory, it is thought that substantially planar sidewalls prevent the formation of eddies, and thus substantially planar sidewalls increase the efficiency of fluid-flow within the fluid flow channel.

The fluid flow control apparatus may comprise one or more fans. The, or each, fan may be a radial fan. The fluid flow control apparatus may comprise one or more pumps.

The fluid outlet of the fluid flow control apparatus may be connectable to the fluid inlet of the fluid flow channel by way of an attachment mechanism. The attachment mechanism may be a snap fit connector.

The attachment mechanism may be a releasable attachment mechanism. The attachment mechanism may comprise a plug and a socket.

The plug may comprise one or more socket engagement portions. At least one of the socket engagement portions may be a resilient member. At least one of the socket engagement portions may be a flexible member. At least one of the socket engagement portions may be biased to be in a first position. At least one of the socket engagement portions may comprise a rectangular cuboid, which optionally is a substantially rounded rectangular cuboid.

The socket may comprise one or more plug engaging portions. At least one of the plug engaging portions may be a slot, aperture, hole, or the like. At least one of the plug engaging portions may be a substantially rectangular shaped hole in the socket. At least one of the plug engaging portions may be a rectangular shaped hole in the socket, which optionally is a substantially rounded rectangular shaped hole.

The plug and the socket may be configured to be movable between an unlocked state and a locked state. When moved between the unlocked state and the locked state, at least one of the socket engagement portions may move from the first position to a second position, and optionally from the second position to the first position.

The fluid flow control apparatus may comprise one or more batteries. The one or more batteries may be housed within the housing of the fluid flow control apparatus.

The control module may be connectable to the fluid flow control apparatus. The control module may be configurable to control the fluid flow control apparatus. The control module may be configurable to control the flow rate of fluid exiting the fluid outlet of the fluid flow control apparatus. The control module may be configurable to control the fluid flow control apparatus by way of wireless communication. The control module may be configurable to control the fluid flow control apparatus by way of a wired connection between the control module and the fluid flow control apparatus. The fluid flow control apparatus may comprise an electrical connector. The electrical connector may be located on an upper region of the fluid flow control apparatus. The electrical connector may be located on a top surface of the fluid flow control apparatus. The electrical connector may be located substantially adjacent to the fan outlet of the housing of the fluid flow control apparatus. The control module may comprise one or more batteries. The control module may comprise one or more rechargeable batteries. The control module may comprise one or more universal serial bus (USB) ports. The one or more rechargeable batteries of the control module may be recharged by way of the USB port of the control module. The rechargeable battery of the fluid flow control apparatus may be recharged by way of the one or more USB ports of the control module. The rechargeable battery of the fluid flow control apparatus may be recharged by way of a charging port. The charging port may be located on the housing of the fluid flow control apparatus. The charging port may be located substantially adjacent to the rechargeable battery. The charging port may be located on a top surface of the fluid flow control apparatus. The charging port may be located substantially adjacent to the fan outlet of the housing of the fluid flow control apparatus.

The first fluid dispersion layer may comprise one or more fluid dispersion layers. The first fluid dispersion layer may comprise a first part and a second part. The first fluid dispersion layer may comprise a first part and a second part, wherein the first part and the second part are attachable to each other. The first part and the second part may be attachable to each other, and may be configurable to fit over the support structure. In this arrangement, the first fluid dispersion layer may be placed over the support structure. In this arrangement, the first fluid dispersion layer may be placed over the support structure, and may be secured by way of a fastening mechanism, or attachment mechanism. The fastening mechanism may be one or more, or a plurality of, snap fasteners. The fastening mechanism may be one or more, or a plurality of, stitches, or the like.

The first fluid dispersion layer may be configured to wick moisture away from the user. That is, the first fluid dispersion layer may be configured to remove fluid from the user by way of a wicking mechanism.

The first fluid dispersion layer may comprise one or more, or a plurality of, non-porous sections. The, or each, non-porous section may be configurable to block the flow of fluid through the first fluid dispersion layer.

The first fluid dispersion layer may comprise an upper region and a lower region. The lower region of the first fluid dispersion layer may be located proximal to the fluid inlet. The upper region of the first fluid dispersion layer may be located distal to the fluid inlet.

The, or each, non-porous section may be located on the lower region of the first fluid dispersion layer. The, or each, non-porous section may be located on the upper region of the first fluid dispersion layer.

The first fluid dispersion layer may comprise one or more fluid inlet engagement portions. The one or more fluid inlet engagement portions may be configurable to engage with, or substantially surround, the fluid inlet. In this arrangement, a portion of the first fluid dispersion layer surrounds the fluid inlet. The one or more fluid inlet engagement portions may be configurable to engage with, or substantially surround, a portion of the fluid flow control apparatus.

The second fluid dispersion layer may be in the form of a cover layer. The second fluid dispersion layer may be in the form of a cover layer which acts as a housing for, for example, the first, second, and third support layers, the fluid flow channel, and the first fluid dispersion layer.

The second fluid dispersion layer may be attachable to a mobility device, such as a wheelchair, or the like. The second fluid dispersion layer may be attachable to a mobility device, or the like, by way of a fastening mechanism. The fastening mechanism may be a hook and loop mechanism. In this arrangement, the second fluid dispersion layer may surround or house the support structure, and the second fluid dispersion layer may be attachable to a mobility device, or the like, such that the support structure is affixed to the mobility device.

The second fluid dispersion layer may be configured to wick moisture away from the user. That is, the second fluid dispersion layer may be configured to remove fluid from the user by way of a wicking mechanism.

At least a part of the second fluid dispersion layer may be porous. The porous part may be made from a porous, or mesh like, material. The porous part may have a substantially rectangular cross section. At least one edge of the porous part may be arcuate. At least one edge of the porous part may be sine wave shaped.

The second fluid dispersion layer may comprise one or more, or a plurality of, non-porous sections. The, or each, non-porous section may be configurable to block the flow of fluid. In this arrangement, fluid may flow through the porous part of the second fluid dispersion layer. In this arrangement, fluid may be prevented from flowing through the non-porous section of the second fluid dispersion layer.

The second fluid dispersion layer may comprise an upper region and a lower region. The lower region of the second fluid dispersion layer may be located proximal to the fluid inlet. The upper region of the second fluid dispersion layer may be located distal to the fluid inlet.

The, or each, non-porous section may be located on the lower region of the second fluid dispersion layer. The, or each, non-porous section may be located on the upper region of the second fluid dispersion layer. The, or each, non-porous section may have a substantially rectangular cross section.

The mobility device may be a wheelchair, or the like.

One or more of the sidewalls of the fluid flow channel may comprise an outer surface that is in contact with or that faces at least one of the first support layer, the second support layer and the third support layer.

The fluid flow channel may comprise a support layer engagement portion. The support structure may be arranged such that the support layer engagement portion is engageable with at least one of the first support layer, the second support layer and the third support layer. The support layer engagement portion may comprise one or more protrusions.

At least a part of the support layer engagement portion may be located on one or more of the sidewalls of the fluid flow channel. At least a part of the support layer engagement portion may be located on one or more of the outer surfaces of the sidewalls of the fluid flow channel. The support layer engagement portion may comprise one or more protrusions located on one or more of the sidewalls of the fluid flow channel. The one or more protrusions may be located on one or more of the outer surfaces of the sidewalls of the fluid flow channel. The one or more protrusions may be planar members and/or tabs.

The one or more protrusions may be angled away from the outer surface of the sidewalls. The one or more protrusions may be angled away from the outer surface of the sidewalls by up to approximately 90°. The one or more protrusions may be angled away from the outer surface of the sidewalls by up to approximately 90°, such that the protrusions slope generally towards the inlet of the fluid flow channel.

At least one of the first support layer, the second support layer and the third support layer may be configured to accommodate at least a part of the support layer engagement portion. At least one of the first support layer, the second support layer and the third support layer may be configured to accommodate at least a part of the support layer engagement portion by way of one or more slots, slits, cut-out portions, or the like.

The fluid flow channel may comprise a rigid member. The rigid member may be at least partly located on the bottom section of the fluid flow channel. The rigid member may be connected to the sidewalls of the fluid flow channel. The rigid member may be integrally formed with the fluid flow channel. The rigid member may be one or more struts, rods, bars, or the like. The rigid member may be arranged in a hatch arrangement. The hatch arrangement may be a substantially rhombus hatch arrangement, or the like. The rigid member may be configured to mitigate deformation of the fluid flow channel. The rigid member may be configured to increase the rigidity of the fluid flow channel. The rigid member may be configured to provide support to the fluid flow channel.

The fluid flow control apparatus may comprise a frame member. The frame member may be releasably attachable to the housing of the fluid flow control apparatus. The frame member may be secured to the housing of the fluid flow control apparatus, optionally by way of an adhesive. The adhesive may be a glue, or the like. The frame member may be a bar, a rod, a pole, a cable, or the like. The frame member may be a planar member. The second fluid dispersion layer may be attachable to the frame member. The second fluid dispersion layer may be attachable to the frame member by way of the fastening mechanism of the second fluid dispersion layer. The frame member may be integrally formed with the housing of the fluid flow control apparatus. The frame member may be made from a plastic material.

According to a second aspect of the invention there is provided a support structure comprising:
  a fluid flow channel, the fluid flow channel comprising:
    a fluid inlet; and
    a fluid outlet.

At least part of the fluid flow channel may be tapered. The at least part tapered fluid flow channel may comprise a first end and a second end, the first end of the at least part tapered fluid flow channel being located proximal to the fluid inlet and the second end of the at least part tapered fluid flow channel being located distal to the fluid inlet. The width of the second end of the at least part tapered fluid flow channel may be greater than the width of the first end of the at least part tapered fluid flow channel.

Embodiments of the second aspect of the invention may include one or more features of the first aspect of the invention or its embodiments. Similarly, embodiments of the first aspect of the invention may include one or more features of the second aspect of the invention or its embodiments.

According to a third aspect of the invention there is provided a cushion comprising:
  a fluid flow channel, the fluid flow channel comprising:
    a fluid inlet; and
    a fluid outlet.

At least part of the fluid flow channel may be tapered. The at least part tapered fluid flow channel may comprise a first end and a second end, the first end of the at least part tapered fluid flow channel being located proximal to the fluid inlet and the second end of the at least part tapered fluid flow channel being located distal to the fluid inlet. The width of the second end of the at least part tapered fluid flow channel may be greater than the width of the first end of the at least part tapered fluid flow channel.

Embodiments of the third aspect of the invention may include one or more features of the first or second aspects of the invention or their embodiments. Similarly, embodiments of the first or second aspects of the invention may include one or more features of the third aspect of the invention or its embodiments.

According to a fourth aspect of the invention there is provided an apparatus for controlling the temperature of a user comprising:
  a fluid flow channel, the fluid flow channel comprising:
    a fluid inlet; and
    a fluid outlet.

At least part of the fluid flow channel may be tapered. The at least part tapered fluid flow channel may comprise a first end and a second end, the first end of the at least part tapered fluid flow channel being located proximal to the fluid inlet and the second end of the at least part tapered fluid flow channel being located distal to the fluid inlet. The width of the second end of the at least part tapered fluid flow channel may be greater than the width of the first end of the at least part tapered fluid flow channel.

Embodiments of the fourth aspect of the invention may include one or more features of the first, second or third aspects of the invention or their embodiments. Similarly, embodiments of the first, second or third aspects of the invention may include one or more features of the fourth aspect of the invention or its embodiments.

According to a fifth aspect of the invention, there is provided an apparatus for providing fluid to a support structure for supporting the body of a user, the apparatus comprising:
 a support structure for supporting the user, the support structure comprising:
  a fluid flow channel, the fluid flow channel comprising:
   a fluid inlet; and
   a fluid outlet;
 wherein at least part of the fluid flow channel is tapered, the at least part tapered fluid flow channel comprising a first end and a second end; the first end of the at least part tapered fluid flow channel being located proximal to the fluid inlet and the second end of the at least part tapered fluid flow channel being located distal to the fluid inlet; and wherein the width of the second end of the at least part tapered fluid flow channel is greater than the width of the first end of the at least part tapered fluid flow channel.

The fluid may be air.

The apparatus may further comprise a fluid flow control apparatus.

The fluid flow control apparatus may be a fan. The fluid flow control apparatus may be a pump, or the like.

Embodiments of the fifth aspect of the invention may include one or more features of the first, second, third or fourth aspects of the invention or their embodiments. Similarly, embodiments of the first, second, third or fourth aspects of the invention may include one or more features of the fifth aspect of the invention or its embodiments.

According to a sixth aspect of the invention, there is provided an apparatus for controlling the temperature of a support structure for supporting the body of a user, the apparatus comprising:
 a support structure for supporting the user, the support structure comprising:
  a fluid flow channel, the fluid flow channel comprising:
   a fluid inlet; and
   a fluid outlet;
 wherein at least part of the fluid flow channel is tapered, the at least part tapered fluid flow channel comprising a first end and a second end; the first end of the at least part tapered fluid flow channel being located proximal to the fluid inlet and the second end of the at least part tapered fluid flow channel being located distal to the fluid inlet; and wherein the width of the second end of the at least part tapered fluid flow channel is greater than the width of the first end of the at least part tapered fluid flow channel.

The fluid may be air.

The apparatus may further comprise a fluid flow control apparatus.

The fluid flow control apparatus may be a fan. The fluid flow control apparatus may be a pump, or the like.

Embodiments of the sixth aspect of the invention may include one or more features of the first, second, third, fourth or fifth aspects of the invention or their embodiments. Similarly, embodiments of the first, second, third, fourth, or fifth aspects of the invention may include one or more features of the sixth aspect of the invention or its embodiments.

According to a seventh aspect of the invention there is provided a method of providing fluid to the user of a mobility device or the like, the method comprising the steps of:
 providing a support structure for supporting the user, the support structure comprising:
  a fluid flow channel, the fluid flow channel comprising:
   a fluid inlet; and
   a fluid outlet;
 wherein at least part of the fluid flow channel is tapered, the tapered part comprising a first end and a second end;
 the first end of the tapered part being located proximal to the fluid inlet and the second end of the tapered part being located distal to the fluid inlet;
 wherein the width of the second end of the tapered part is greater than the width of the first end of the tapered part; and
 providing fluid to the fluid flow channel via the fluid inlet, such that fluid flows through the fluid outlet to the user.

The fluid may be air.

The method may comprise the step of providing a fluid flow control apparatus.

The method may comprise the step of connecting the fluid inlet to a fluid flow control apparatus.

The fluid flow control apparatus may be a fan. The fluid flow control apparatus may be a pump, or the like.

The fluid may be dispersed after or on flowing through the fluid outlet.

Embodiments of the seventh aspect of the invention may include one or more features of the first, second, third, fourth, fifth or sixth aspects of the invention or their embodiments. Similarly, embodiments of the first, second, third, fourth, fifth or sixth aspects of the invention may include one or more features of the seventh aspect of the invention or its embodiments.

According to an eighth aspect of the invention there is provided a method of dispersing fluid, the method comprising the steps of:
 providing a support structure for supporting a user, the support structure comprising:
  a fluid flow channel, the fluid flow channel comprising:
   a fluid inlet; and
   a fluid outlet;
 wherein at least part of the fluid flow channel is tapered, the tapered part comprising a first end and a second end;
 the first end of the tapered part being located proximal to the fluid inlet and the second end of the tapered part being located distal to the fluid inlet;
 wherein the width of the second end of the tapered part is greater than the width of the first end of the tapered part;
 providing fluid to the fluid flow channel via the fluid inlet, such that fluid flows through the fluid outlet to the user; and
 dispersing the fluid after or on flowing through the fluid outlet such that dispersed fluid is provided to the user.

The fluid may be air.

The method may comprise the further step of providing a fluid flow control apparatus.

The method may comprise the step of connecting the fluid inlet to a fluid flow control apparatus.

The fluid flow control apparatus may be a fan. The fluid flow control apparatus may be a pump, or the like.

Embodiments of the eighth aspect of the invention may include one or more features of the first, second, third, fourth, fifth, sixth or seventh aspects of the invention or their embodiments. Similarly, embodiments of the first, second, third, fourth, fifth, sixth or seventh aspects of the invention may include one or more features of the eighth aspect of the invention or its embodiments.

According to a ninth aspect of the invention there is provided an apparatus comprising the support structure of the first aspect of the invention.

Embodiments of the ninth aspect of the invention may include one or more features of the first, second, third, fourth, fifth, sixth, seventh or eighth aspects of the invention or their embodiments. Similarly, embodiments of the first, second, third, fourth, fifth, sixth, seventh or eighth aspects of the invention may include one or more features of the ninth aspect of the invention or its embodiments.

BRIEF DESCRIPTION OF THE DRAWINGS

Embodiments of the invention will now be described, by way of example, with reference to the drawings, in which:

FIG. 8a is a front view of the second fluid dispersion layer of the support structure of FIG. 1;

FIG. 8b is a side view of the second fluid dispersion layer of the support structure of FIG. 1;

FIG. 8c is an isometric view of the second fluid dispersion layer of the support structure of FIG. 1;

FIG. 8d is a back view of the second fluid dispersion layer of the support structure of FIG. 1;

FIG. 9a is a front view of an alternative embodiment of the second fluid dispersion layer of the support structure of FIG. 1;

FIG. 9b is a side view of an alternative embodiment of the second fluid dispersion layer of the support structure of FIG. 1;

FIG. 9c is an isometric view of an alternative embodiment of the second fluid dispersion layer of the support structure of FIG. 1;

FIG. 9d is a back view of an alternative embodiment of the second fluid dispersion layer of the support structure of FIG. 1;

FIG. 10a is a front view of an alternative embodiment of the first, second and third support layers of the support structure of FIG. 1;

FIG. 10b is a side view of an alternative embodiment of the first, second and third support layers of the support structure of FIG. 1;

FIG. 10c is a top view of an alternative embodiment of the first, second and third support layers of the support structure of FIG. 1;

FIG. 10d is an isometric view of a back section of an alternative embodiment of the first, second and third support layers of the support structure of FIG. 1;

FIG. 12a is a top view of an alternative embodiment of the fluid flow control apparatus of the support structure of FIG. 1;

FIG. 12b is a front view of an alternative embodiment of the fluid flow control apparatus of the support structure of FIG. 1;

FIG. 12c is a side view of an alternative embodiment of the fluid flow control apparatus of the support structure of FIG. 1;

DESCRIPTION OF EMBODIMENTS

With reference to FIGS. 1 to 5, a support structure 1 for supporting the user of a mobility device, or the like, is illustrated.

Figure 1:
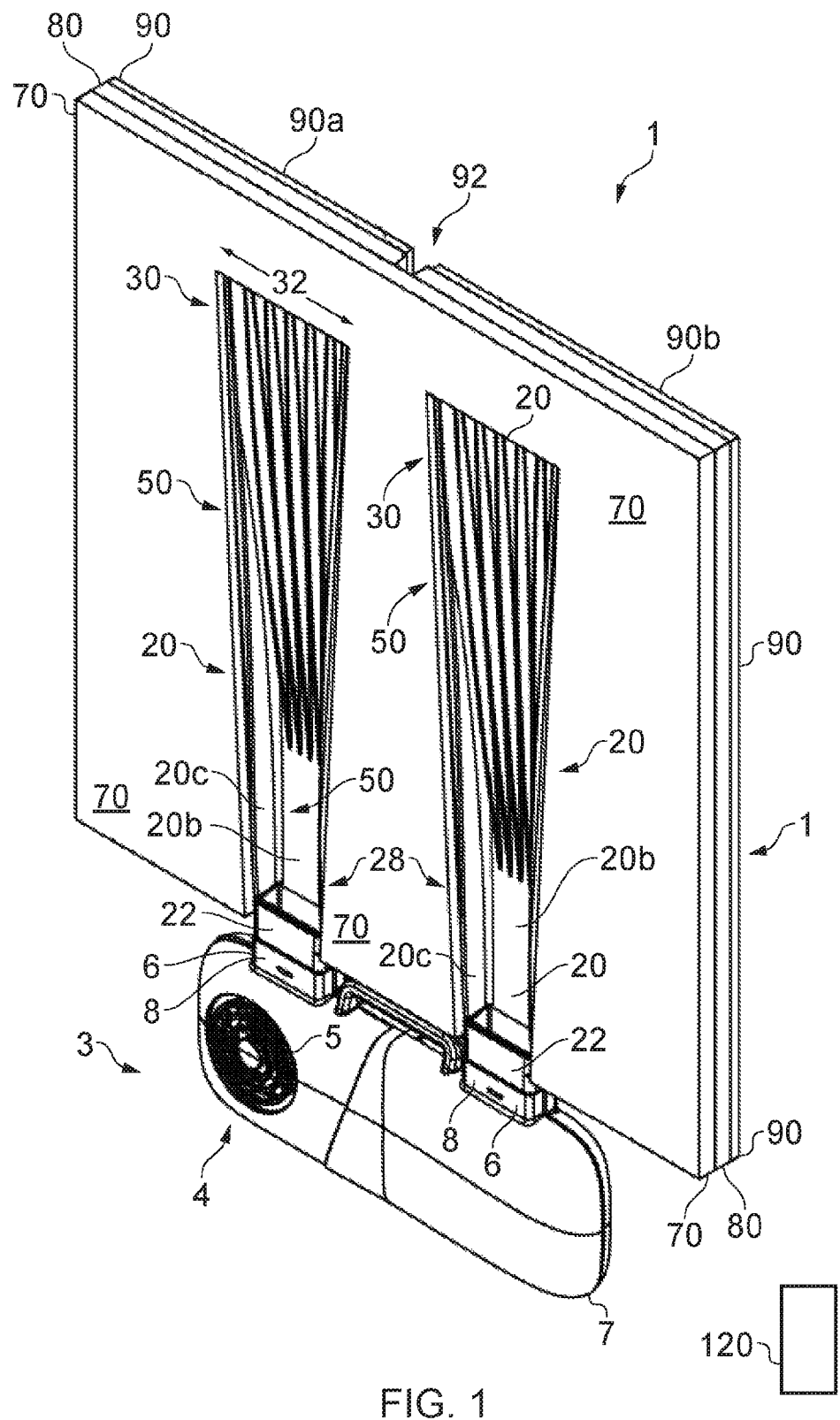
FIG. 1 is an isometric view of the support structure according to an embodiment of this invention.
Figure 3:
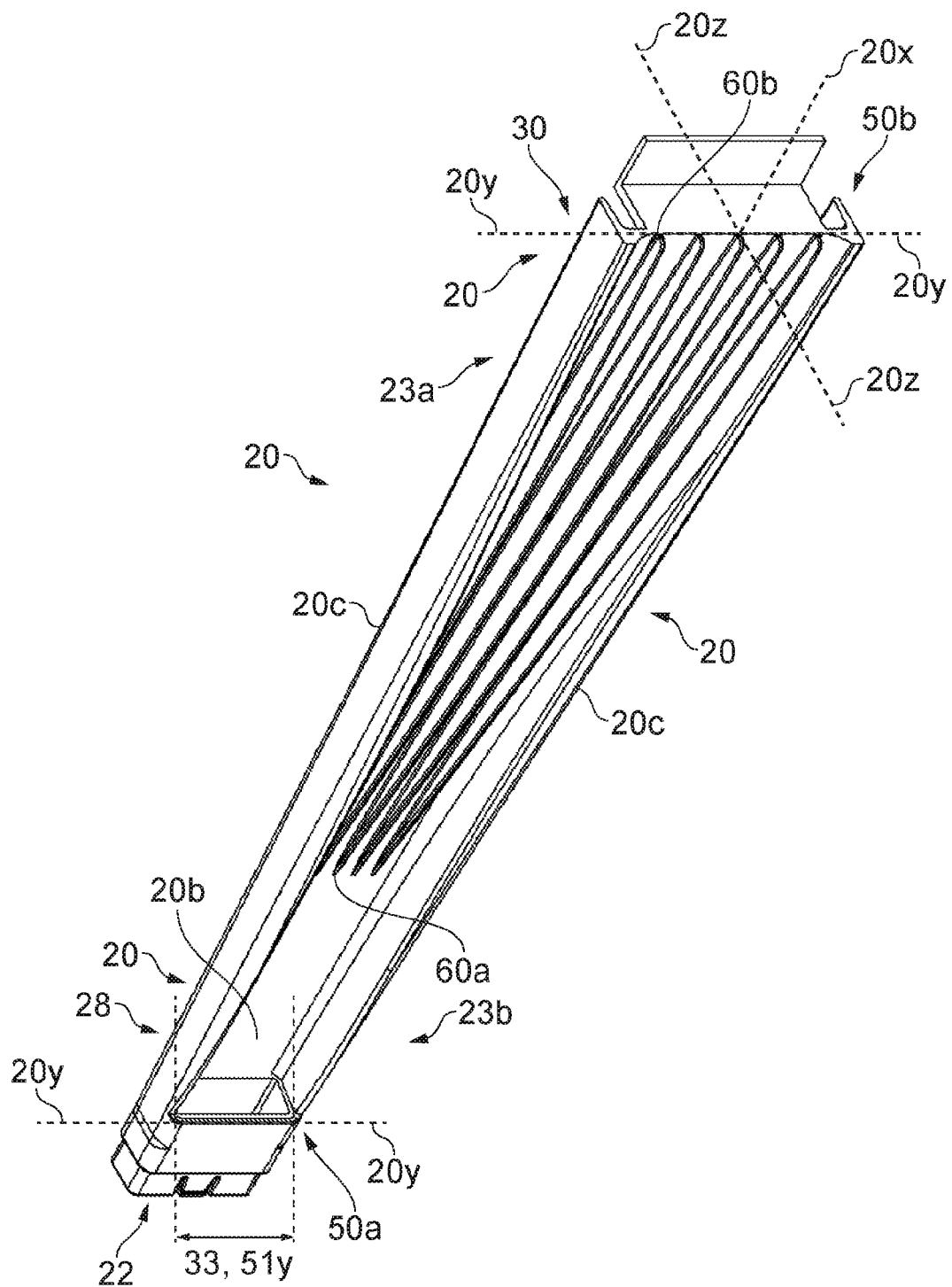
FIG. 3 is an isometric view of one of the fluid flow channels of the support structure of FIG. 1.

With reference to FIG. 1 the support structure 1 has two fluid flow channels 20. The fluid flow channels 20 have a fluid inlet 22 and a fluid outlet 50. As best shown in FIG. 3, the fluid flow channels 20 have a length axis 20x, a width axis 20y and a depth axis 20z. In the embodiment illustrated and described here, substantially the whole of the fluid flow channels 20 are tapered. The tapered channels 20 have a first end 28 and a second end 30. The first end 28 is located proximal to the fluid inlet 22 and the second end 30 is located distal to the fluid inlet 22. As best shown in FIG. 3, the width 32 of the second end 30 of the tapered channels 20 is greater than the width 33 of the first end 28 of the tapered channels 20. In this arrangement, the maximum width of each tapered channel 20 is located furthest from the fluid inlet 22. The maximum width is therefore located at the second end 30 of each tapered channel 20. However, it should also be understood that the maximum width of each tapered channel 20 could be located at other locations throughout the fluid flow channel 20. It should also be understood that at least a part of (rather than substantially all of) each fluid flow channel 20 could be tapered. Furthermore, it will be understood that there could be one or more, or a plurality of, tapered parts 20 within the, or each, fluid flow channel 20. In some embodiments, at least a part of the fluid flow channel 20 could be flexible.

As best shown in FIG. 3, each fluid flow channel 20 comprises a top section 21, a bottom section 20b and sidewalls 20c. Each fluid flow channel 20 has a length, width and depth. The length of each fluid flow channel 20 is the distance between the first end 28 and the second end 30. The width of each fluid flow channel 20 is the distance between the sidewalls 20c. The depth of each fluid flow channel 20 is the distance between the top section 21 and the bottom section 20b. In the embodiment illustrated and described here, the minimum width of each tapered channel 20 is located closest to the fluid inlet 22.

As shown in FIG. 3, the tapered channel 20 is formed by the divergence of the sidewalls 20c of each fluid flow channel 20. That is, the minimum distance between the sidewalls 20c is located proximal to the fluid inlet 22, and the maximum distance between the sidewalls 20c is located distal to the fluid inlet 22. In this arrangement, the divergence of the sidewalls 20c occurs from proximal the fluid inlet 22 to distal the fluid inlet 22. As shown in FIG. 3, the depth of the first end 28 of the at least part tapered fluid flow channel 20 is greater than the depth of the second end 30 of the at least part tapered fluid flow channel 20.

The sidewalls 20c of each fluid flow channel 20 are substantially elongate planar members. Without wishing to be bound by theory, it is thought that substantially planar sidewalls 20c prevent the formation of eddies, and thus substantially planar sidewalls 20c increase the efficiency of fluid-flow within each fluid flow channel 20.

As shown in FIGS. 1 and 2, in the embodiment illustrated here, the fluid outlet 50 is formed from an open part 21a of the top section 21 of the fluid flow channel 20. The top section 21 of the fluid flow channel 20 also comprises a closed part 21b. However, it should be understood that the fluid outlet 50 could be formed from one or more apertures in each fluid flow channel 20.

Each fluid flow channel 20 is configured such that fluid can flow from the fluid inlet 22 to the fluid outlet 50. Each tapered channel 20 allows fluid from the fluid inlet 22 to flow throughout the fluid flow channel 20, such that fluid can exit from the fluid outlet 50 throughout the whole of fluid flow channel 20. This exiting of fluid throughout the whole of the fluid flow channel 20 is used to provide fluid to the user of a mobility device over a wider area.

Without wishing to be bound by theory, it is thought that for a fixed supply of fluid to the fluid inlet 22, the absence of a tapered channel 20 will result in a reduced amount of fluid reaching the upper region 23a of each fluid flow channel 20 and an increase in the amount of fluid exiting the lower region 23b. This will then result in fluid being provided to the user over a reduced area. Subsequently, the cooling effect to the user will be reduced. The supply of fluid to the fluid inlet 22 will then need to be increased to achieve the same area of fluid provided to the user. This could result in, for example, the need for a larger fluid flow control apparatus 3 and/or a larger electrical power system or battery.

In this embodiment, as shown in FIGS. 1 and 2, substantially the whole of the top section 21 of each fluid flow channel 20 is open 21a. However, it should be understood that at least a part of the top section 21 of each fluid flow channel 20 could be open. The open section 21a of the top section 21 forms the fluid outlet 50. For example, the top section 21 of each fluid flow channel 20 could be formed mainly by a closed section 21b, but the closed section 21b having a number of apertures that act as fluid outlets 50.

Figures 2A, 2B:
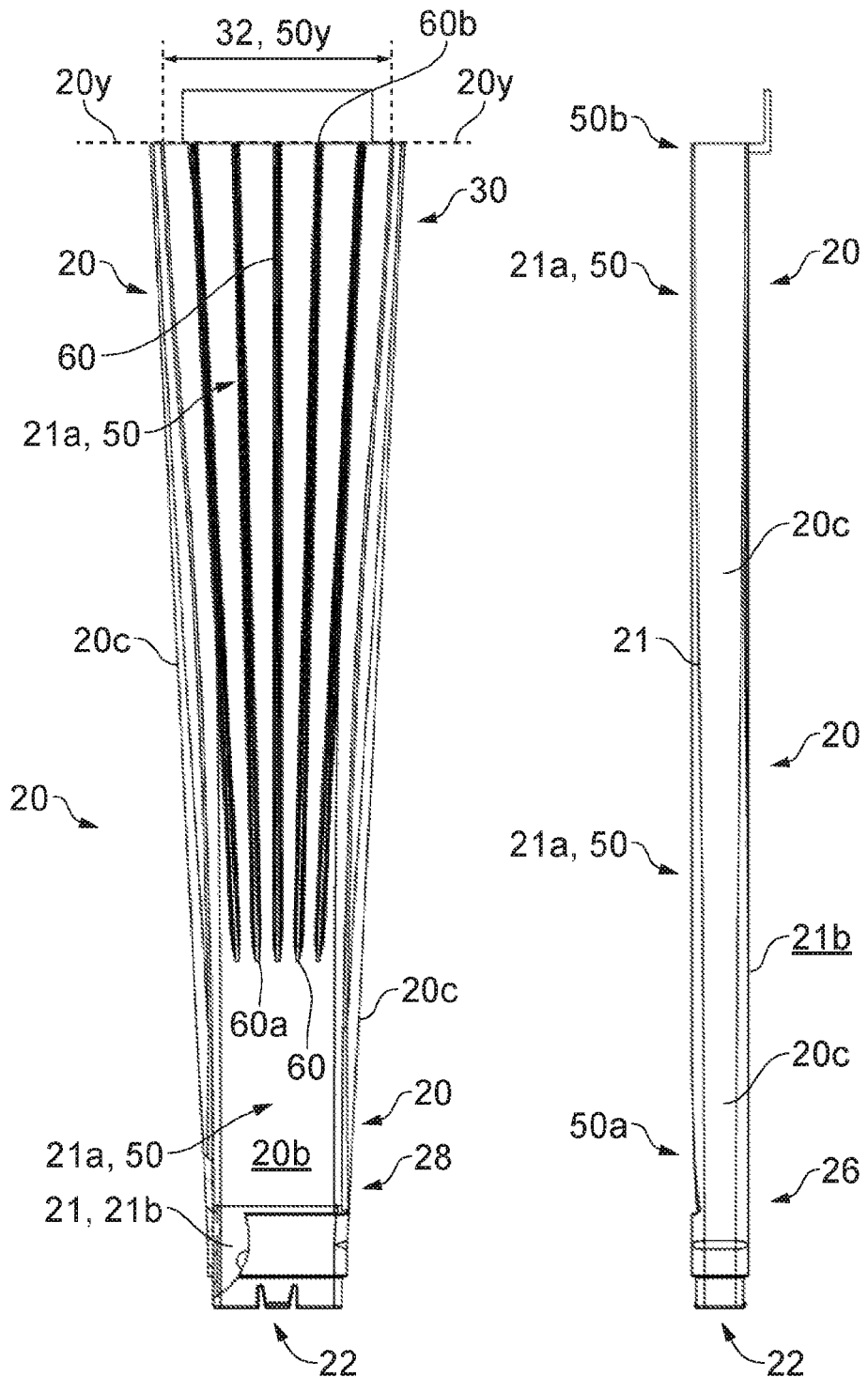
FIG. 2a is a top view of one of the fluid flow channels of the support structure of FIG. 1.
FIG. 2b is a side view of one of the fluid flow channels of the support structure of FIG. 1.

In this embodiment, and as best shown in FIG. 2a, the fluid outlet 50 comprises a first end 50a and a second end 50b. The first end 50a of the fluid outlet 50 is located proximal to the fluid inlet 22 and has a width 51y, and the second end 50b of the fluid outlet 50 is located distal to the fluid inlet 22 and has a width 50y. The width 50y of the second end 50b of the fluid outlet 50 is greater than the width 51y of the first end 50a of the fluid outlet 50. In this arrangement, the fluid outlet 50 is tapered. The fluid outlet 50 is substantially the same shape as the tapered channels 20.

In this embodiment, the fluid is air.

As best shown in FIG. 3, the fluid flow channel 20 has a number of fins 60, which are elongate longitudinal members arranged substantially longitudinally from the first end 28 of each fluid flow channel 20 to the second end 30 of each fluid flow channel 20. Each fin 60 comprises a first end 60a and a second end 60b, the first end 60a of each fin 60 being located proximal to the fluid inlet 22 and the second end 60b of each fin 60 being located distal to the fluid inlet 22. The separation between the fins 60 is greater at the second end 60b than at first end 60a. In this arrangement, the fins 60 are tapered. This arrangement of the fins 60 minimises the obstruction of the flow of fluid from the fluid inlet 22.

In the embodiment illustrated and described here, the height of each fin 60, measured with reference to the depth axis 20z, has an arcuate shape from proximal to the fluid inlet 22, to distal to the fluid inlet 22. That is, the profile of each fin, measured from proximal to the fluid inlet 22, to distal to the fluid inlet 22, has an arcuate shape. The fins 60 prevent each fluid flow channel 20 from becoming partially or completely blocked by the weight of the user. The fins 60 provide support to the user and are made from a resilient material, such as, for example, polyurethane or a moulded elastomer.

Figure 4:
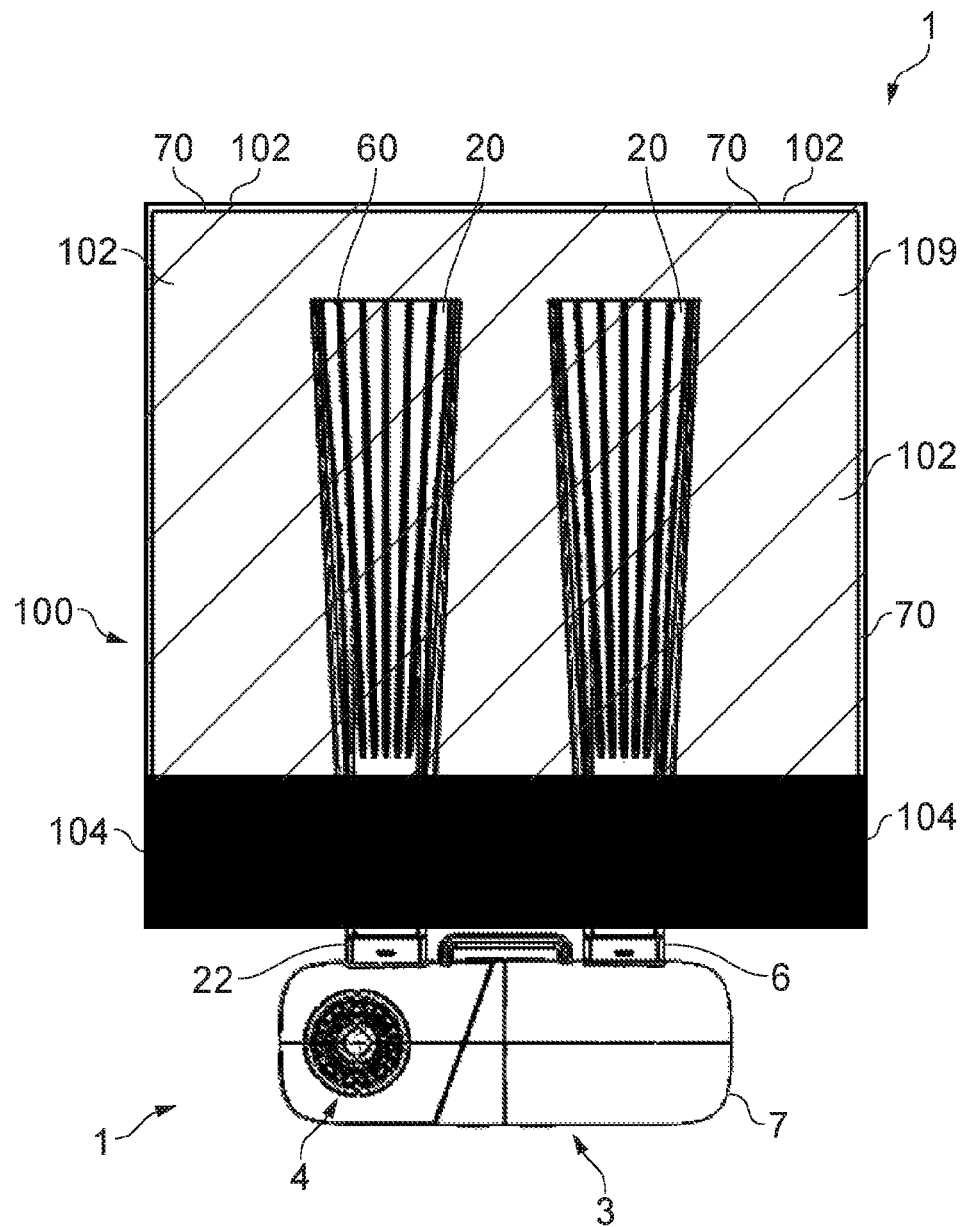
FIG. 4 is a front view of the support structure of FIG. 1.
Figure 5A:
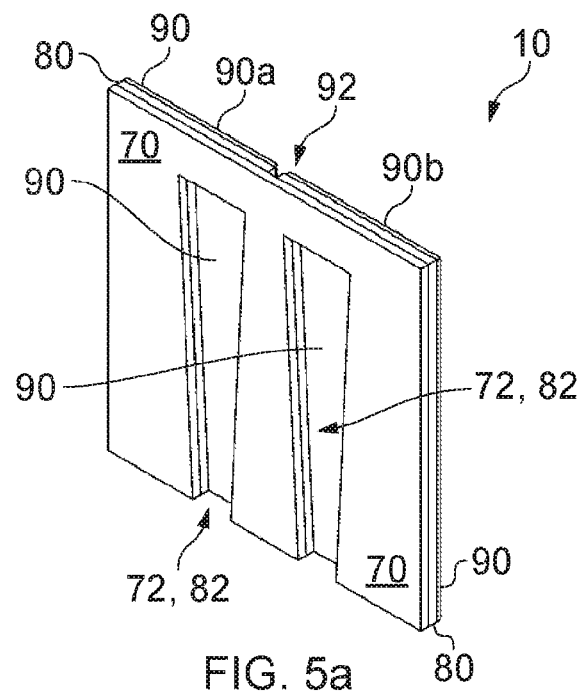
FIG. 5a is an isometric view of the first, second and third support layers of the support structure of FIG. 1.
Figure 5B:
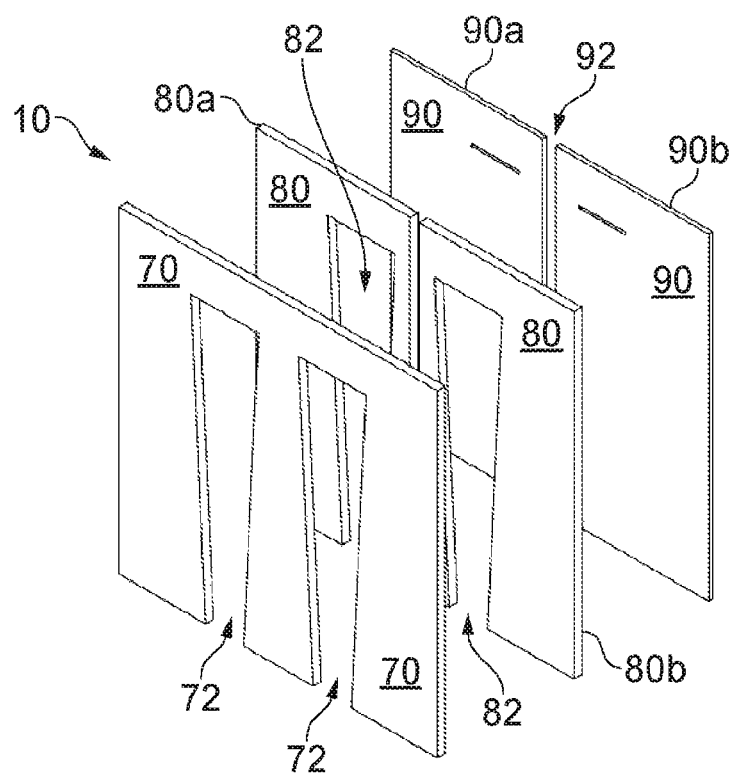
FIG. 5b is an exploded view of the first, second and third support layers of the support structure of FIG. 1.

As best shown in FIGS. 4 and 5, the support structure 1 comprises first, second and third support layers 70, 80, 90, which are substantially planar members. The support layers 70, 80, 90 are made from a foam like material. For example, the support layers 70, 80, 90 could be made from a memory foam type material, to provide support and comfort to the user. As shown in FIG. 5, the first and second support layers 70, 80, have shaped sections, which act as fluid flow channel engagement sections 72, 82. In this embodiment, there are two fluid flow channel engagement sections 72, 82 in the first and second support layers 70, 80, which are engageable with the fluid flow channels 20. As shown in FIGS. 1 and 4, the first and second support layers 70, 80 substantially surround the fluid flow channels 20. The fluid flow channel engagement sections 72, 82 are tapered to substantially match the shape of the fluid flow channels 20, and also the shape of the fluid outlet 50.

The third support layer 90 inter alia protects, and provides support to, the fluid flow channels 20. For example, in use the support structure 1 will typically be attached to a mobility device, and the third support layer 90 minimises the wear and tear that would result from the fluid flow channels 20 contacting the mobility device. In some embodiments, the third support layer 90 minimises the wear and tear caused to other parts of the support structure 1 by preventing those parts of the support structure 1 from contacting the fluid flow channel 20. The third support layer 90 also contributes to the support and comfort provided to the user. As will be described in more detail below, in an alternative embodiment, the first support layer 70 may be folded over the third support layer 90. In this arrangement, at least a section of the first support layer 70 also provides protection, and provides support to, the fluid flow channels 20.

Figure 6A:
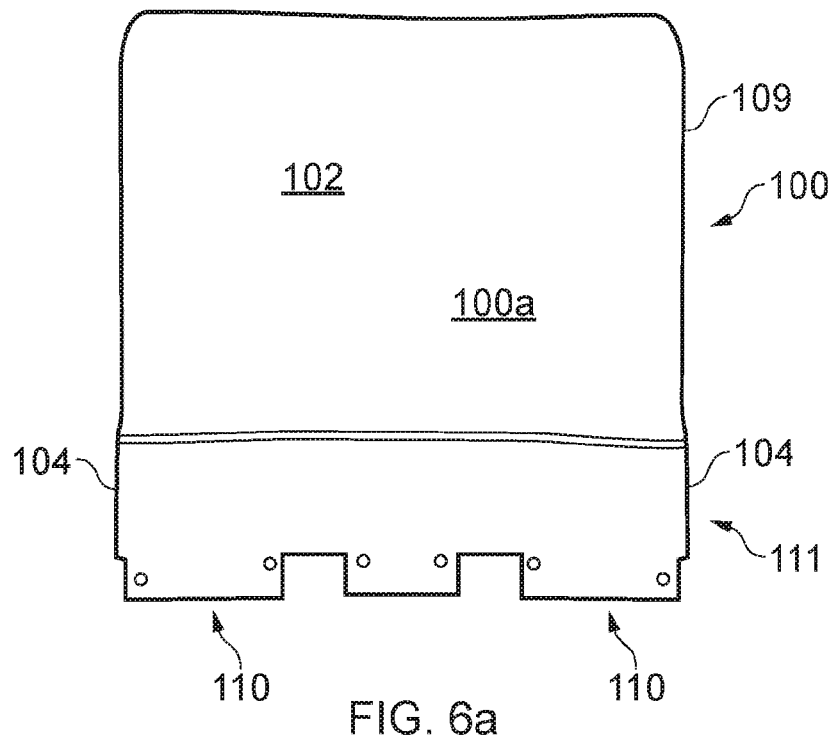
FIG. 6a is a front view of the first fluid dispersion layer of the support structure of FIG. 1.
Figure 6B:
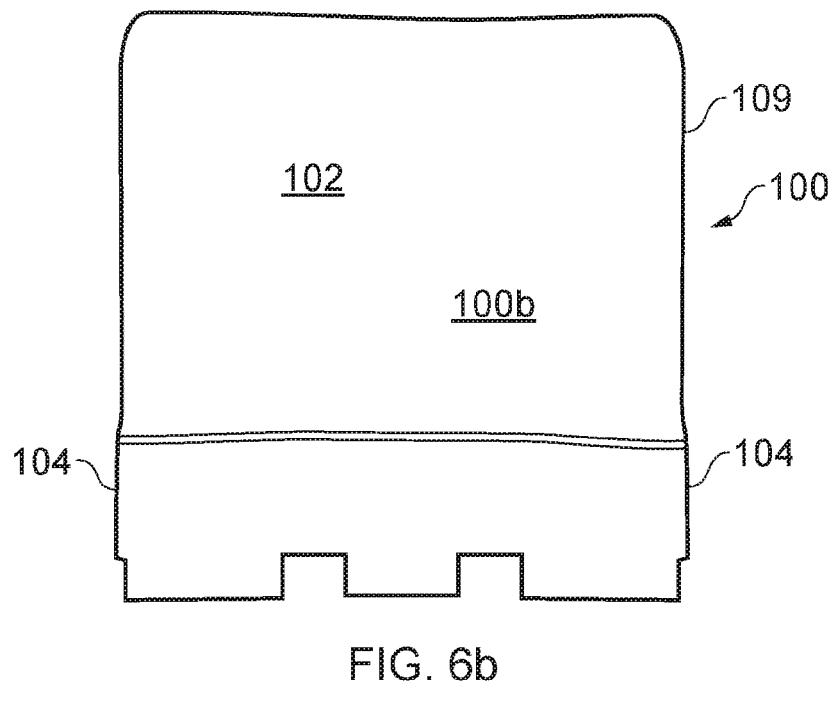
FIG. 6b is a back view of the first fluid dispersion layer of the support structure of FIG. 1.

As best shown in FIGS. 4, 6a and 6b, the support structure 1 comprises a first fluid dispersion layer 100. The first fluid dispersion layer 100 is formed from two parts 100a, 100b that are attached together to form a pouch, which can then be placed over the support layers 70, 80, 90. The first fluid dispersion layer 100 is then secured in place by way of a fastening mechanism 110 in order to surround the first, second and third support layers 70, 80, 90. The fastening mechanism 110 is a plurality of snap fasteners, however other fastening mechanisms 110 could be used. For example, the fastening mechanism 110 could be one or more, or a plurality of, stitches. The first fluid dispersion layer 100 is made from a fabric material. A part of the first fluid dispersion layer 100 is porous 102, and the remaining part of the fluid dispersion layer is non-porous 104. The non-porous part 104 is configured to substantially block the flow of fluid therethrough. The first fluid dispersion layer 100 is configured to allow fluid exiting the fluid outlet 50 to flow through the porous part 102.

As shown in FIG. 4, the porous part 102, which in this embodiment has a larger surface area than the fluid outlet 50, disperses fluid from the fluid outlet 50. The dispersion of the fluid results in fluid being provided to the user over a wider area, and thus the cooling effect of providing fluid to the user is dispersed over a wider area. This is advantageous when cooling the user, and when removing moisture from the user. Furthermore, by dispersing the fluid in this manner, the user is less aware of the flow of fluid. That is, in the absence of a fluid dispersion layer 100, the user will be more aware of the flow of fluid from the fluid flow channel 20 to the user, as the fluid flow would be concentrated on only those sections where there is a fluid outlet 50. The provision of the first fluid dispersion layer 100 thus improves the comfort of the user.

The non-porous part 104 of the first fluid dispersion layer 100 can be used to better direct the flow of fluid from the fluid outlet 50 through the first fluid dispersion layer 100. As depicted in FIG. 4, the non-porous part 104 blocks a substantial portion of the fluid outlet 50, and is located on a lower region 111 of the first fluid dispersion layer 100. In this arrangement, the fluid flow can be controlled by changing the layout of the non-porous part 104 and the porous part 102. For example, if the support structure 1 is used as a back rest for a mobility device, the size of the non-porous part 104 could be selected in order to direct more fluid towards a user's back or towards a particular area of a user's back. In other applications, the non-porous part 104 could be selected to provide different fluid flow patterns as desired by the user, or as designed for. Likewise, the fluid outlet 50 could be comprised of open and closed portions to provide for customised fluid flow, depending upon the needs of the user.

In this embodiment, and as shown in FIG. 4, a part of the fluid outlet 50 overlaps with the porous part 102 of the first fluid dispersion layer 100. However, it should be understood that substantially the whole of the fluid outlet 50 could be configured to overlap with the porous part 102 of the first fluid dispersion layer 100.

In this embodiment, the width of the porous part 102 of the first fluid dispersion layer 100 is greater than the width of the fluid outlet 50. The length of the porous part 102 of the first fluid dispersion layer 100 is greater than the length of the fluid outlet 50.

Figure 7:
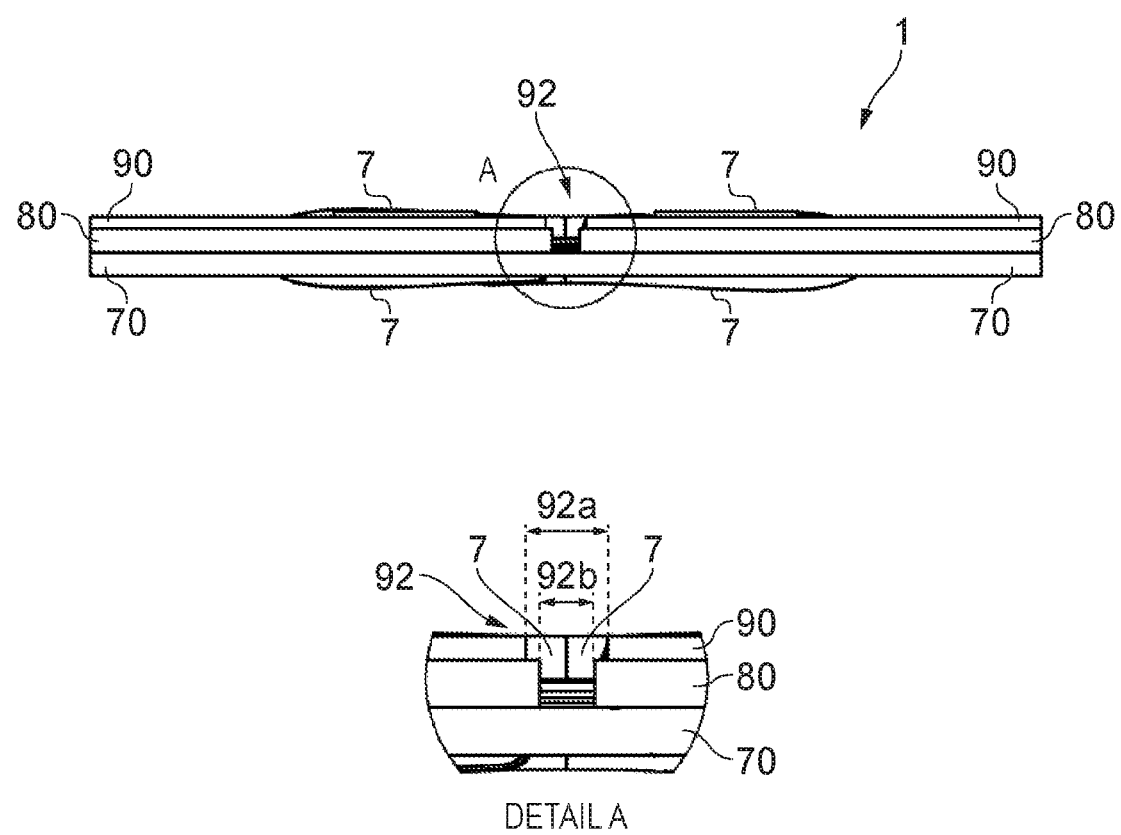
FIG. 7 is a top view of the support structure of FIG. 1.

As best shown in FIG. 7 the support structure 1 is foldable, by way of a flexible region 92. Folding the support structure 1 assists in the ability to transport the present invention, for example, when travelling by road, air, rail etc. A person may carry the support structure 1, for example, underarm in a more convenient manner because the support structure 1 is foldable. As shown in FIG. 5, the third support layer 90 is divided into two parts 90a, 90b. Likewise, the second support layer 80 is also divided into two parts 80a, 80b. As shown in FIG. 7, there is a gap 92a between the two parts 90a, 90b of the third support layer 90, and a gap 92b between the two parts 80a, 80b of the second support layer 80. The flexible region 92 is formed from the gap 92a and the gap 92b in combination with the first support layer 70, the gaps 92a and 92b enabling the support structure 1 to be folded along the path formed by the gaps 92a and 92b. However it should be understood that the flexible region 92 could be a notch within, one or more of the support layers 70, 80, 90. The flexible region 92 allows the support structure 1 to be foldable, at least in part because the centre part of the support structure 1 does not contain any fluid flow components. In this embodiment, the width of the gap 92a in the third support layer 90 is greater than the width of the gap 92b in the second support layer 80, which improves the ability of the support structure 1 to be folded.

With reference to FIG. 5, in this embodiment, the first support layer 70 comprises a length of between approximately 300 mm and approximately 420 mm, a width of between approximately 300 mm and approximately 420 mm, and a thickness of between approximately 5 mm and approximately 15 mm. The second support layer 80 comprises a length of between approximately 300 mm and approximately 420 mm, a width of between approximately 300 mm and approximately 420 mm, and a thickness of between approximately 5 mm and approximately 15 mm. The third support layer 90 comprises a length of between approximately 300 mm and 420 mm, a width of between approximately 300 mm and 420 mm, and a thickness of between approximately 3 mm and approximately 7 mm. However, it should be understood that the third support layer 90 could have a length of between approximately 320 mm and 340 mm. However, it should be understood that the first support layer 70 could comprise a length of between approximately 300 mm and approximately 770 mm, the second support layer 80 could comprise a length of between approximately 300 mm and approximately 770 mm, and the third support layer 90 could comprise a length of between approximately 300 mm and approximately 770 mm.

As best shown in FIG. 8, the support structure 1 further comprises a second fluid dispersion layer 112. The second fluid dispersion layer 112 is configured to surround the support layers 70, 80, 90 and the fluid flow channel 20. The second fluid dispersion layer 112 can be attached to a mobility device by way of a fastening mechanism 114, which is formed by hook and loop fasteners located on flaps. The second fluid dispersion layer 112 thus attaches the support structure 1 to the mobility device. The second fluid dispersion layer 112 comprises a fluid flow control apparatus attachment mechanism 114', which may be used to attach a fluid flow control apparatus 3 to the second fluid dispersion layer 112. However, it should be understood that in some embodiments the support structure 1 need not comprise a second fluid dispersion layer 112. Furthermore, in some embodiments, the second fluid dispersion layer 112 need not comprise a fastening mechanism 114.

As shown in FIG. 8, the second fluid dispersion layer 112 comprises a porous part 116 and a non-porous part 118. The porous part 116 is configured to allow fluid to flow from the first fluid dispersion layer 100, through the second fluid dispersion layer 112 to the user. The non-porous part 118 is configured to block the flow of fluid. In the embodiment described here, the porous part 116 is substantially rectangular in shape, with two arcuate, or sine wave shaped, sides. It should be understood that the porous part of the second fluid dispersion layer 112 could be of a number of different shapes, and could comprise different layouts of porous 116 and non-porous 118 sections.

With reference to FIGS. 4 and 6, the porous part 102 of the first fluid dispersion layer 100 provides a wicking effect, in order to wick moisture away from the user. With reference to FIG. 8, the porous part 116 of the second fluid dispersion layer 112 also provides a wicking effect, in order to wick moisture away from the user. In this embodiment, the second fluid dispersion layer 112 provides fluid to the user. It should be appreciated that in some embodiments it may be the second fluid dispersion layer 112 that provides a wicking effect.

With reference to FIGS. 6 and 8, the fluid dispersion layers 100, 112, may be detached, cleaned, and re-attached to improve the ease of maintaining and cleaning the support structure 1.

As best shown in FIG. 1, the support structure is attached to a fluid flow control apparatus 3, which in this embodiment is a fan 4. However, it should be understood that the support structure could comprise a fluid flow control apparatus 3. In some embodiments, the fluid flow control apparatus 3 could be a pump, or the like. The fan 4 is a rotary fan, and is housed within a housing 7. The housing 7 has a fan inlet 5, through which ambient air can flow into the fan 4, and a fan outlet 6 through which air from the fan 4 can flow. The fan outlet 6 of the housing 7 is engageable with the fluid inlet 22 of the support structure 1 by way of an attachment mechanism 8, which is a snap fit connector. The fluid flow control apparatus 3 is detachable which improves the ability of the support structure 1 to be transported. The user may disconnect the fluid flow control apparatus 3 from the support structure 1, and fold the support structure 1, to assist in the transport of the support structure 1. It should be understood that the fluid flow control apparatus 3 could be attached to the second fluid dispersion layer 112 by way of the fluid flow control apparatus attachment mechanism 114'.

Electrical power is supplied to the fluid flow control apparatus 3 by way of a rechargeable battery (not shown), for example, a lithium ion battery. The battery is housed within the housing 7. In this embodiment, the battery is configured to provide a voltage of between approximately 2.4 Volts and 4.2 Volts. The battery is configured to provide a maximum current of 3 Amperes. The battery is configured such that, in use, the battery provides electrical power to the fluid flow control apparatus for between approximately 3 hours and 20 hours. The battery has a capacity of between approximately 7000 mAh and 9000 mAh.

As shown in FIG. 1, a control module 120 is configured to control the fluid flow control apparatus 3. The control module 120 may control the flow rate of fluid flowing to the user. The control module 120 is therefore operable to control the temperature of the user by controlling the operation of the fluid flow control apparatus 3. The control module 120 is housed within a remote control, which is connected to the fluid flow control apparatus 3. However, it should be understood that the control module 120 could control the fluid flow control apparatus 3 by way of wireless communication.

The support structure 1 illustrated and described here is able to cool a user of a mobility device by way of convection cooling. The support structure 1 also contributes to increased evaporation of moisture from the user by providing fluid to the user, and/or through the wicking mechanism of the fluid dispersion layers 100, 112.

FIG. 9 depicts an alternative embodiment of the second fluid dispersion layer 112 of FIG. 8. In the embodiment depicted in FIG. 9, the second fluid dispersion layer 112 is the same as that shown in FIG. 8, with the exception that the layout of the non-porous section 118 and the porous section 116 is different. In the embodiment shown in FIG. 9, the non-porous section 118 is only located on a lower region of the second fluid dispersion layer 112. In this alternative embodiment, the non-porous section 118 of the second fluid dispersion layer 112 has a rectangular cross section.

Figure 10F:
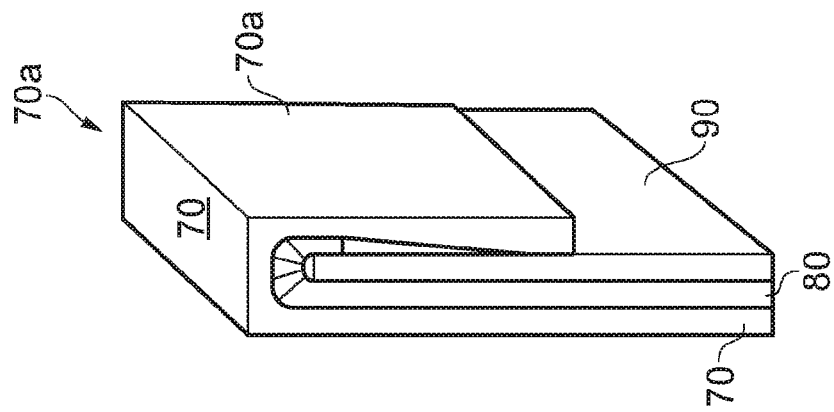
FIG. 10f is an isometric view of an assembled alternative embodiment of the first, second and third support layers of the support structure of FIG. 1.
Figure 10E:
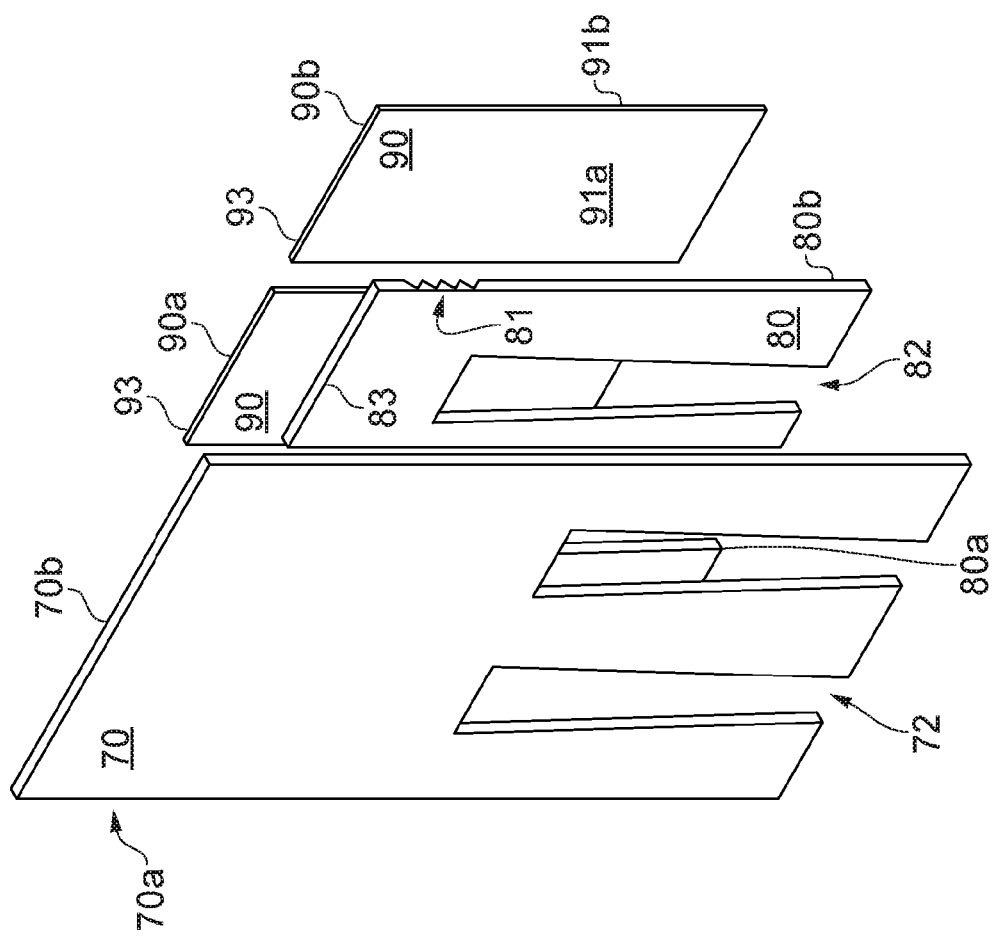
FIG. 10e is an isometric view of an alternative embodiment of the first, second and third support layers of the support structure of FIG. 1.

FIG. 10 shows an alternative embodiment of the first, second and third support layers 70, 80, 90. The second support layer has a top surface 83. The third support layer 90 has a top surface 93, a front surface 91a and a back surface 91b. The first support layer 70 has an upper section 70a.

In this embodiment, and as best shown in FIG. 10b, the first, second and third support layers 70, 80, 90 have a length axis 70x. The length of the first, second and third support layers 70, 80, 90 is in the direction of the length axis 70x. In this embodiment, the length of the first support layer 70 is greater than the length of the second support layer 80. The length of the first support layer 70 is also greater than the length of the third support layer 90. The length of the second support layer 80 is greater than the length of the third support layer 90. However, it should be understood that the length of the second and third support layers 80, 90 could be substantially equal. Because the length of the first support layer 70 is greater than the length of the second and third support layers 80, 90, the upper region 70a of the first support layer 70 can be folded over the second and third support layers 80, 90 as will be described in more detail below.

Assembly of the alternative embodiment of the first, second and third support layers 70, 80, 90 as depicted in FIG. 10 will now be described. The first, second and third support layers 70, 80, 90 are brought together, such that the first support layer 70 is adjacent to the second support layer 80, and such that the second support layer 80 is adjacent to the third support layer 90. Next, the upper section 70a of the first support layer 70 is folded around the top surface 83 of the second support layer 80 and around the top surface 93 and back surface 91b of the third support layer 90. In this arrangement, and as best shown in FIG. 10f, the upper section 70a of the first support layer 70 encapsulates the second support layer 80. Furthermore, a top edge 70b of the first support layer 70 abuts the back surface 91b of the third support layer 90.

In this embodiment, the second support layer 80 comprises a flexible section 81. The flexible section 81 allows a portion of the second support layer 80 to be folded. It should be understood that in some arrangements, the second support layer 80 need not have a flexible section 81. For example, if the second and third support layers 80, 90 are substantially equal in length, the upper region 70a of the first support structure 70 could be folded over the second and third support layers 80, 90, without the need for a flexible section 81 in the second support layer 80. In this embodiment, the flexible section 81 is a corrugated section. However, it should be understood that other types of flexible section could be used. FIG. 11 shows an alternative embodiment of the fluid flow channel 20 of the support structure 1. The fluid flow channel 20 shown in FIG. 11 is substantially the same as those shown in FIGS. 1 to 4 with the following differences.

In the embodiment shown in FIGS. 11a to 11g the fluid flow channel 20 comprises support layer engagement portions 20d in the form of protrusions 20e. In this embodiment, the protrusions are tabs 20e. The fluid flow channel 20 comprises four protrusions 20e. However, it should be understood that the support layer engagement portion 20d could comprise other types of support layer engagement portion 20d. Furthermore, the support layer engagement portion 20d could comprise one or more protrusions, planar members and/or tabs 20e.

In this embodiment, the support structure 1 is arranged such that the support layer engagement portion 20d is engageable with the first support layer 70 and the second support layer 80. However, in other embodiments the support layer engagement portion 20d could engage with one or more of the first support layer 70, the second support layer 80 and the third support layer 90.

Each support layer engagement portion 20d is located on an outer surface 20g of the sidewall 20c of the fluid flow channel 20 that is in contact with or that faces the first support layer 70 and the second support layer 80. In this embodiment the support layer engagement portion 20d comprises one or more protrusions 20e located on the outer surface 20g of the sidewalls 20c of the fluid flow channel 20.

In this embodiment, each of the protrusions 20e are planar members or tabs. Each of the protrusions 20e are angled away from the outer surface 20g of the sidewalls 20c of the fluid flow channel 20. Each of the protrusions 20e could be angled away from the outer surface 20g of the sidewalls 20c of the fluid flow channel 20 by up to approximately 90°. In this embodiment, the protrusions 20e slope generally towards the inlet 22 of the fluid flow channel 20.

It will be understood that in some embodiments, each of the protrusions 20e could be angled away from the outer surface 20g of the sidewalls 20c of the fluid flow channel 20 by up to 90°. For the fluid flow channel 20 illustrated in FIG. 11, the protrusions 20e slope generally towards the inlet 22 of the fluid flow channel 20. In some embodiments, some of the protrusions 20e could slope generally towards the inlet 22 of the fluid flow channel 20, and some of the protrusions 20e could slope generally away from the inlet 22 of the fluid flow channel 20. In other embodiments, the protrusions 20e could slope generally away from the inlet 22 of the fluid flow channel 20.

When the protrusions 20e engage with the first support layer 70 and the second support layer 80, the protrusions 20e mitigate movement of the first support layer 70 and the second support layer 80. During use of the support structure 1 by the end user, it is desirable to mitigate movement of the first, second and third support layers 70, 80 and 90 with respect to the fluid flow channels 20. This is primarily because it is undesirable for gaps between the fluid flow channels 20 and the support layers 70, 80 and 90 to be created during use of the support structure 1, as the end user is likely to experience discomfort as a result of this. The support structure engagement portion 20d is used in this embodiment to reduce the risk of this problem occurring by mitigating movement of the support layers 70, 80 and 90 with respect to the fluid flow channel 20.

Figure 13A:
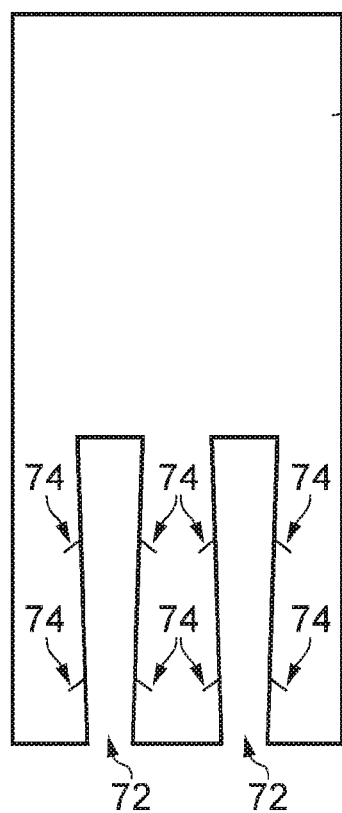
FIG. 13a is a front view of an alternative embodiment of the first support layer of the support structure of FIG. 1.
Figure 13B:
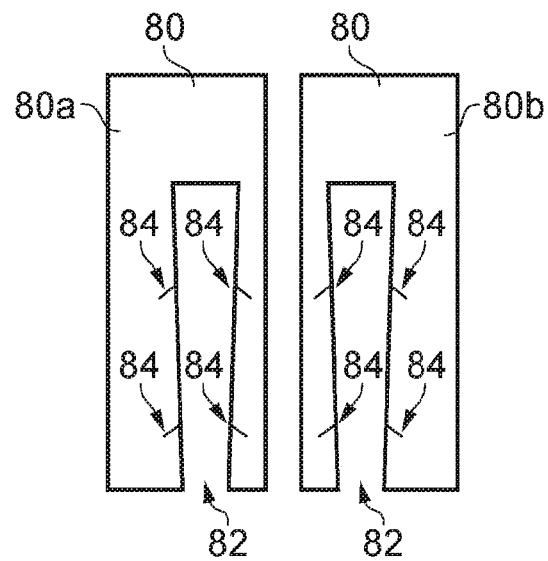
FIG. 13b is a front view of an alternative embodiment of the second support layer of the support structure of FIG. 1.

With reference to FIGS. 13a and 13b, and as described in more detail below, in this embodiment the first support layer 70, the second support layer 80 and the third support layer 90 are configured to accommodate substantially all of the support layer engagement portion 20d by way of eight slits 74 and 84 in each of the first support layer 70 and the second support layer 80.

Figures 11A, 11B:
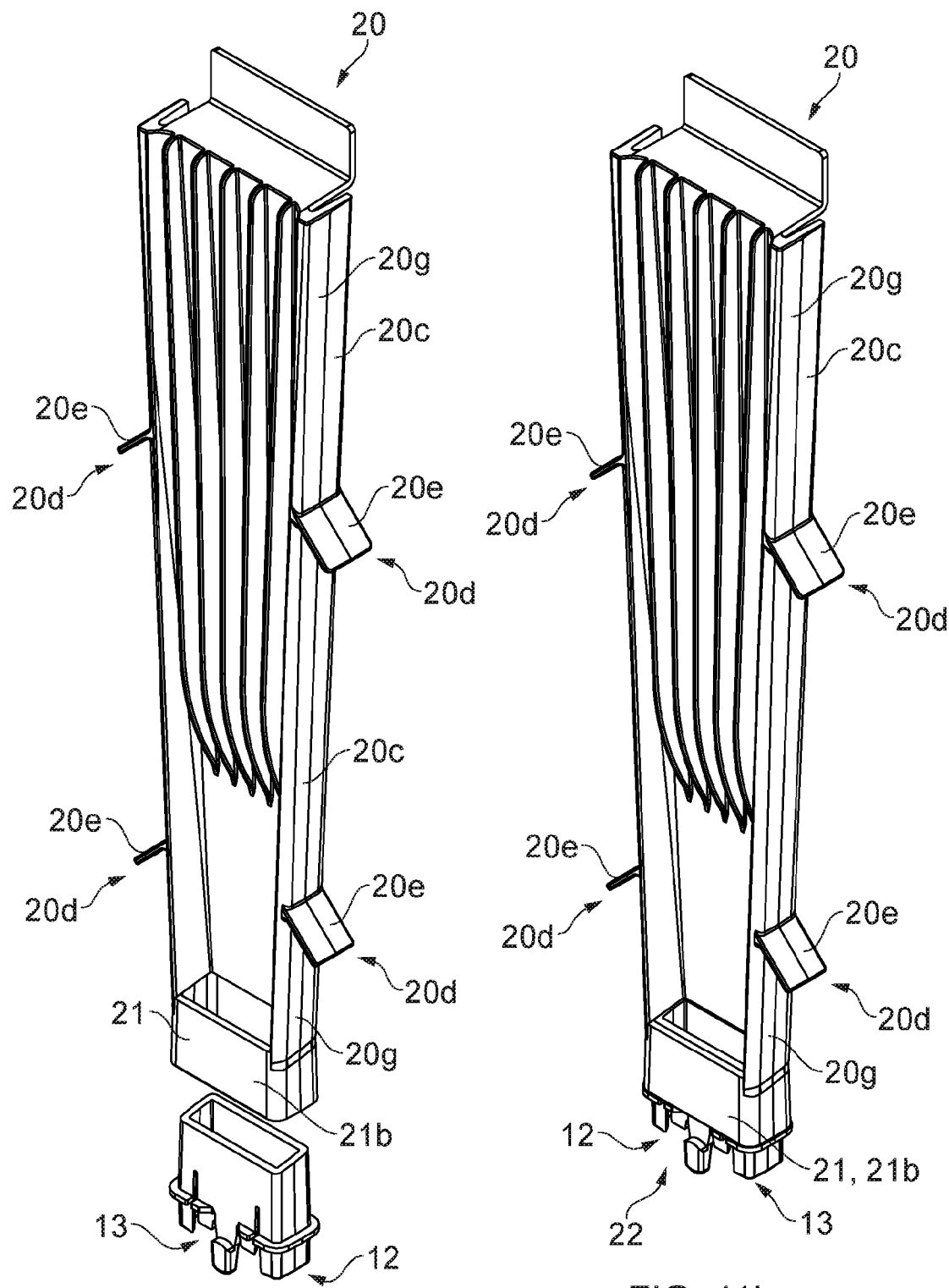
FIG. 11a is an isometric view of an unassembled alternative embodiment of the fluid flow channel of the support structure of FIG. 1.
FIG. 11b is an isometric view of an assembled alternative embodiment of the fluid flow channel of the support structure of FIG. 1.
Figure 11C:
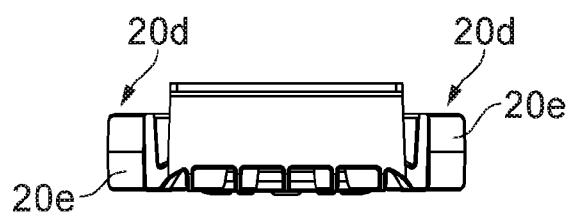
FIG. 11c is a top view of an assembled alternative embodiment of the fluid flow channel of the support structure of FIG. 1.
Figure 11D:
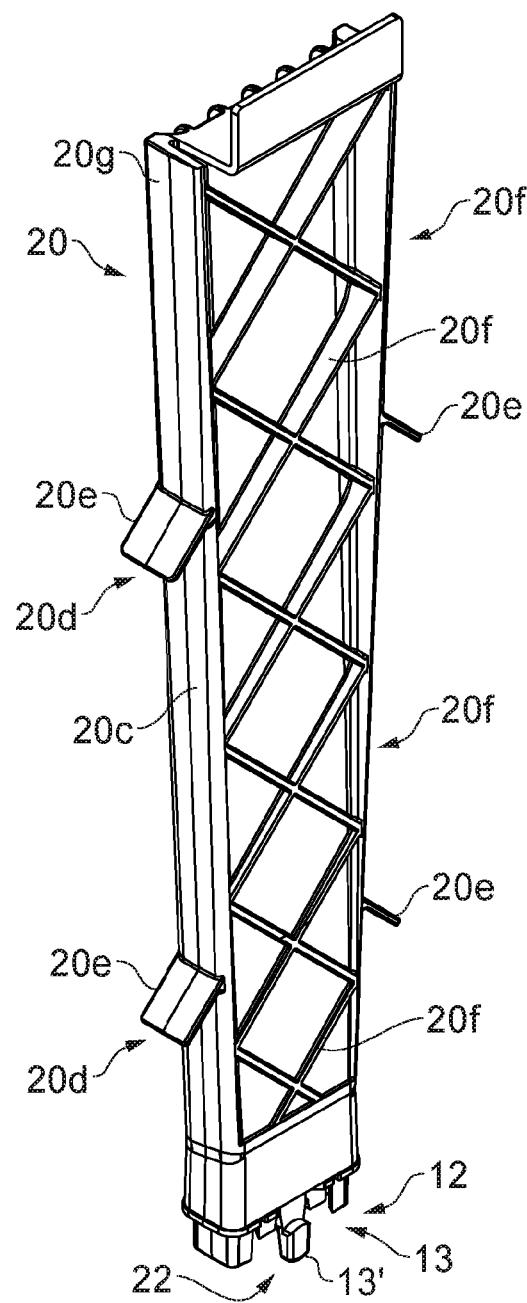
FIG. 11d is an isometric view of an assembled alternative embodiment of the fluid flow channel of the support structure of FIG. 1.
Figure 11E:
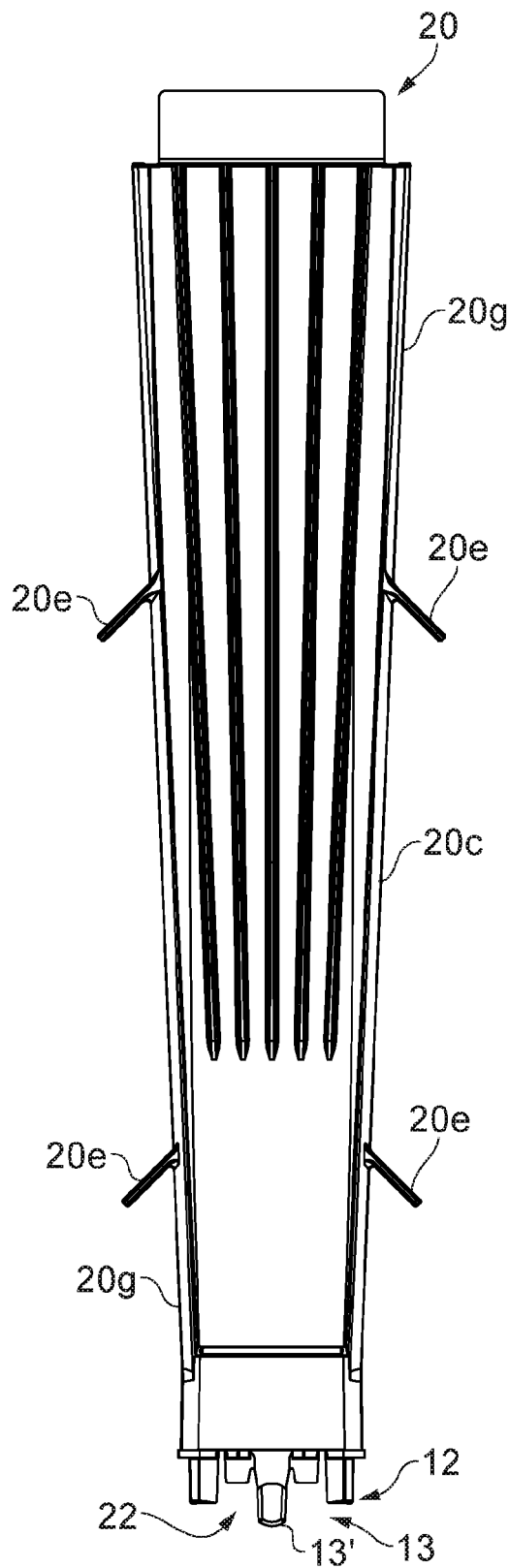
FIG. 11e is a front view of an assembled alternative embodiment of the fluid flow channel of the support structure of FIG. 1.
Figure 11F:
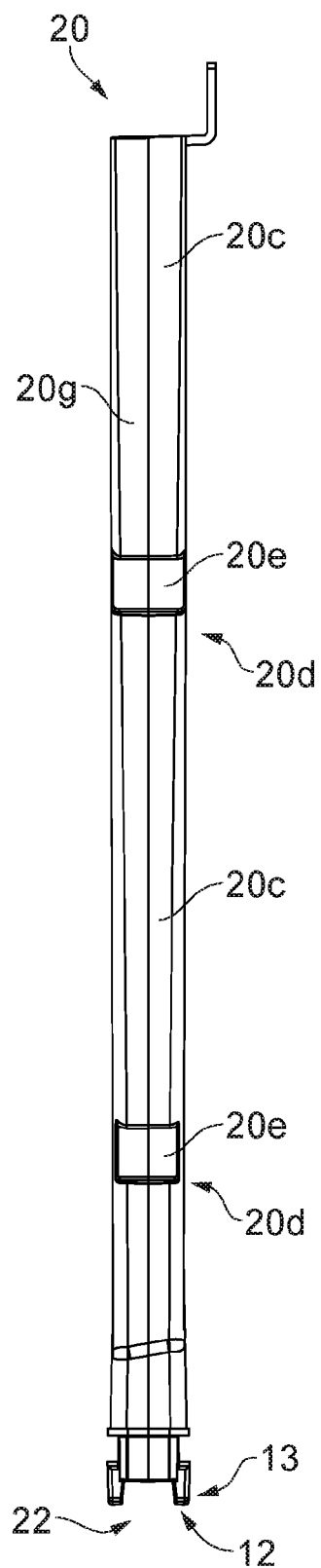
FIG. 11f is a side view of an assembled alternative embodiment of the fluid flow channel of the support structure of FIG. 1.
Figure 11G:
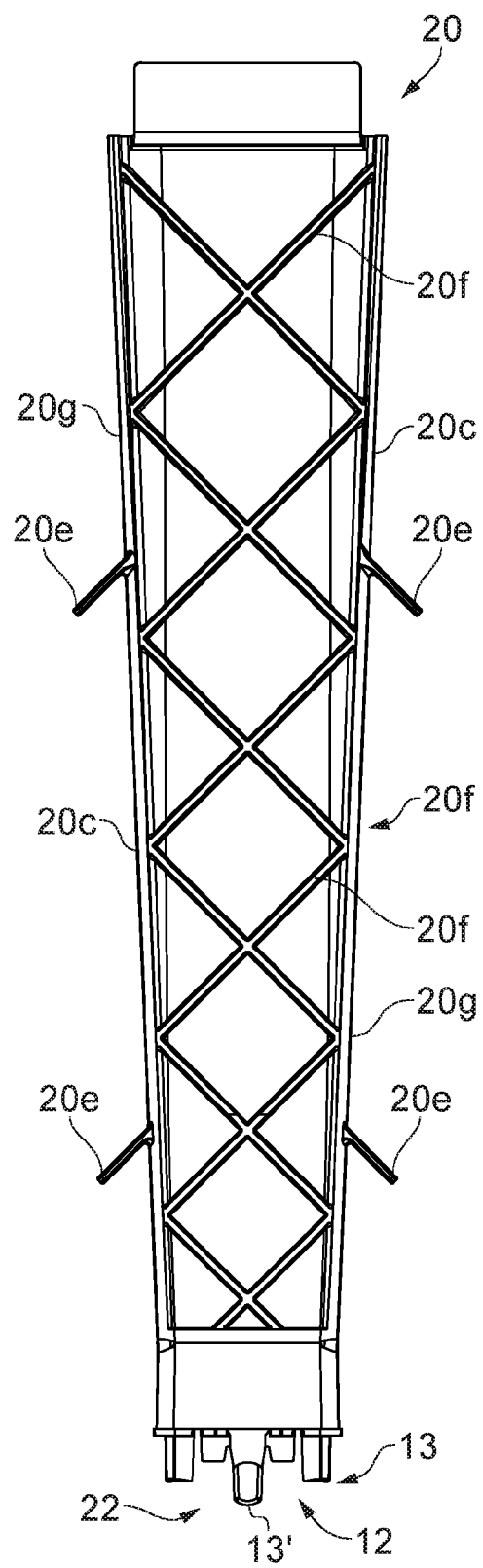
FIG. 11g is a back view of an assembled alternative embodiment of the fluid flow channel of the support structure of FIG. 1.

As best shown in FIG. 11d and FIG. 11g, the fluid flow channel 20 comprises a rigid member 20f connected to the sidewalls 20c of the fluid flow channel 20. The rigid member 20f is located substantially on the bottom section 20b of the fluid flow channel 20 and is integrally formed with the fluid flow channel 20. The rigid member 20f is a series of struts arranged in a hatch arrangement, which in this embodiment is a substantially rhombus hatch arrangement. However, it should be understood that the rigid member 20f could be one or more, rods, bars, or the like.

The rigid member 20f is configured to mitigate deformation of the fluid flow channel 20. The rigid member 20f is configured to increase the rigidity of the fluid flow channel 20. The rigid member 20f is configured to provide support to the fluid flow channel 20.

FIG. 12 shows an alternative embodiment of the fluid flow control apparatus 3, which is substantially the same as the fluid flow control apparatus 3 shown in FIGS. 1 and 4, with the following differences. In this embodiment, the fluid flow control apparatus 3 comprises an electrical connector 10 located on an upper region 7' of the fluid flow control apparatus 3. The electrical connector is located on a top surface 7" of the fluid flow control apparatus 3 substantially adjacent to the fan outlet 6 of the housing 7 of the fluid flow control apparatus 3.

Figure 12D:
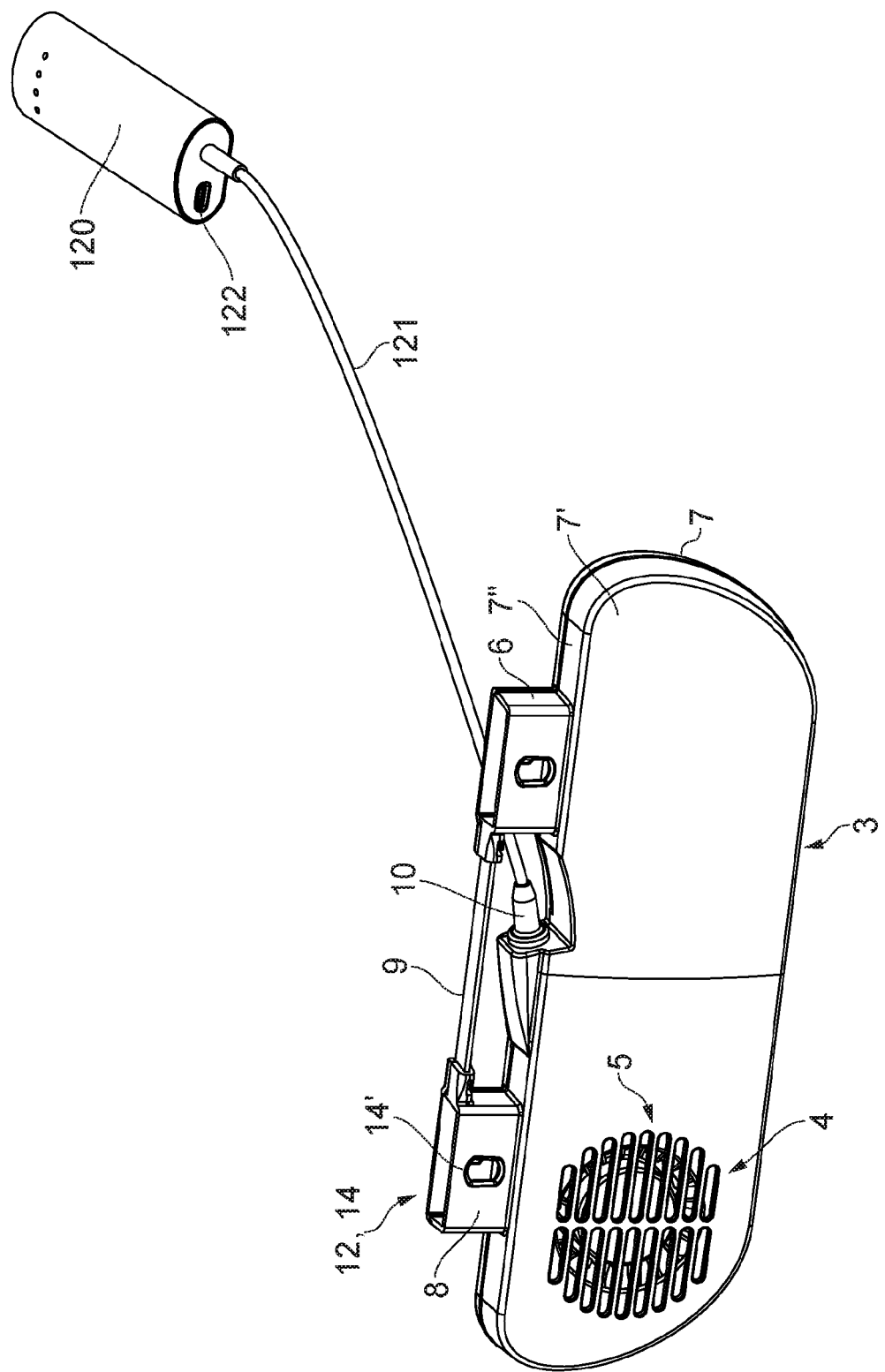
FIG. 12d is an isometric view of an alternative embodiment of the fluid flow control apparatus of the support structure of FIG. 1.
Figure 12E:
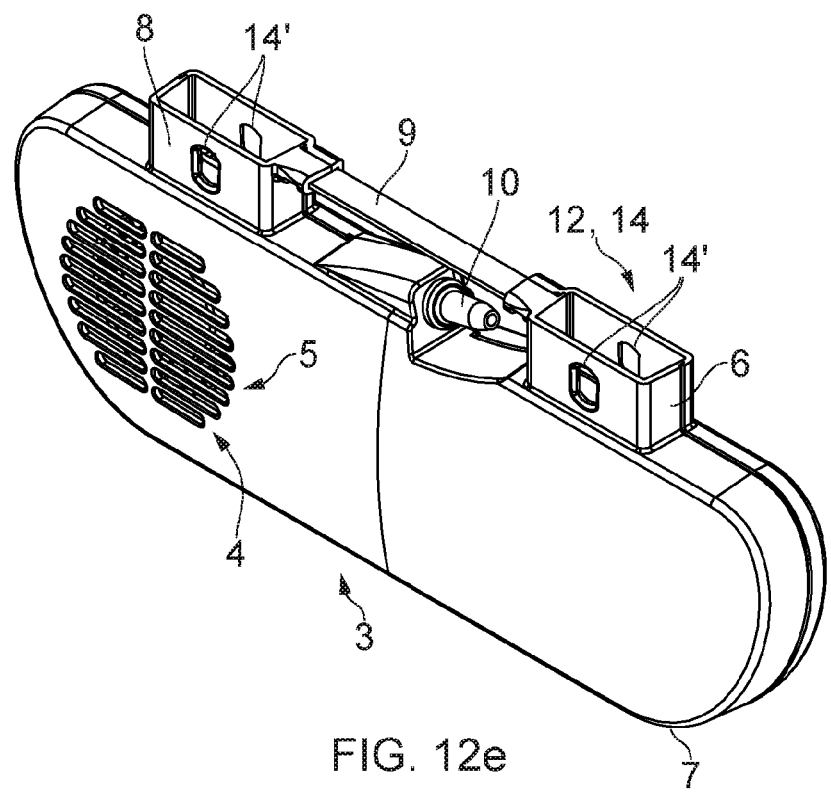
FIG. 12e is an isometric view of an alternative embodiment of the fluid flow control apparatus of the support structure of FIG. 1.

As best shown in FIG. 12d, the fluid flow control apparatus 3 is connected to a control module 120 by way of a wired connection 121. The rechargeable battery of the fluid flow control apparatus 3 can be recharged by way of a universal serial bus (USB) port 122 of the control module 120.

The fluid flow control apparatus 3 comprises a frame member 9. The frame member 9 is secured to the housing 7 of the fluid flow control apparatus 3 by way of a glue (an example of an adhesive). The frame member 9 is a planar member. However, it should be understood that the frame member 9 could be a bar, a rod, a pole, a cable, or the like. In some embodiments, the frame member 9 may be integrally formed with the housing 7 of the fluid flow control apparatus 3.

The second fluid dispersion layer 112 is attachable to the frame member 9 by way of the fastening mechanism 114' of the second fluid dispersion layer 112.

In the embodiment illustrated in FIGS. 11a to 12e, the fluid inlet 22 of the fluid flow channel 20 can be connected to the fan outlet 6 of the housing 7 of the fluid flow control apparatus 3 by way of an attachment mechanism 12. The attachment mechanism 12 is a releasable attachment mechanism 12 comprising a plug 13 and a socket 14.

The plug 13 comprises socket engagement portions. For each fluid flow channel 20, two of the socket engagement portions are resilient, flexible members 13' biased to be in a first position. In this embodiment, two of the socket engagement portions 13' comprise a substantially rounded rectangular cuboid.

Each socket 14 comprises two plug engaging portions, which in this embodiment are apertures 14' in each socket 14.

The plug 13 and the socket 14 are configured to be movable between an unlocked state and a locked state. When moved from the unlocked state to the locked state, the two socket engagement portions 13' move from the first position to a second position, and then from the second position to the first position. The end user can unlock the fluid flow channels 20 from the housing 7 of the fluid flow control apparatus 3 by pressing on the socket engagement portions 13'.

FIG. 13 shows an alternative embodiment of the first support layer 70 and the second support layer 80, which is substantially the same as the first support layer 70 and the second support layer 80 shown in FIG. 10 with the following differences.

The alternative embodiment of the first support layer 70 and the second support layer 80 shown in FIG. 13 is capable of being used with the alternative embodiment of the fluid flow channel 20 shown in FIG. 11, and it is also capable of being used with the fluid flow channel 20 depicted in FIGS. 1 to 4.

In the embodiment shown in FIGS. 13a and 13b, the first support layer 70 and the second support layer 80 are configured to accommodate at least a part of the support layer engagement portions 20d of the fluid flow channel 20, by way of eight slits 74 and 84.

When assembling the support structure 1, the fluid flow channels 20 can be placed into the fluid flow channel engagement portions 72 and 82, and the protrusions 20e of each fluid flow channel 20 can be inserted into the slits 74 and 84 of the first support layer 70 and the second support layer 80.

It should be understood that in some embodiments the slits could be slots, cut-out portions, or the like. Furthermore, in some embodiments at least one of the first support layer 70, the second support layer 80, and the third support layer 90 could be configured to accommodate at least a part of the support layer engagement portions 20d of the fluid flow channel 20. Moreover, whilst in this embodiment the first support layer 70 and the second support layer 80 each comprise eight slits 74 and 84, it should be understood that at least one of the first support layer 70, the second support layer 80 and the third support layer 90 could be configured to accommodate at least a part of the support layer engagement portion 20d of the fluid flow channel 20 by way of one or more slots, slits, cut-out portions, or the like.

In some embodiments, due to the length of the support structure 1, at least a part of the support structure 1 may be foldable to fit around a mobility device, or the like. At least a part of the support structure 1 may be foldable around a backrest of a mobility device, or the like. This allows the support structure 1 to be fitted to a range of different types and sizes of mobility devices. Furthermore, folding the support structure 1 in this way allows the support structure 1 to be secured to a mobility device 1 in a more reliable manner.

Modifications may be made to the foregoing embodiments within the scope of the present invention.

The invention claimed is:

1. A support structure for supporting the user of a mobility device, the support structure comprising:
    a fluid flow channel, the fluid flow channel comprising:
        a fluid inlet configured to direct fluid flow in a first direction; and
        a top section comprising one or more apertures, the one or more apertures forming one or more fluid outlets in the top section configured to direct fluid flow in a second direction, normal to the first direction;
    wherein substantially the whole of the fluid flow channel is tapered, the tapered fluid flow channel comprising a first end and a second end;
    the first end of the tapered fluid flow channel being located proximal to the fluid inlet and the second end of the tapered fluid flow channel being located distal to the fluid inlet;
    wherein the width of the second end of the tapered fluid flow channel is greater than the width of the first end of the tapered fluid flow channel; and
    wherein the, or each, fluid outlet comprises a first end located proximal to the fluid inlet and a second end located distal to the fluid inlet.

2. The support structure of claim 1, wherein the fluid flow channel comprises sidewalls, the minimum separation distance between the sidewalls being located at the first end of the tapered fluid flow channel and the maximum separation distance between the sidewalls being located at the second end of the tapered fluid flow channel.

3. The support structure of claim 1, wherein the depth of the first end of the tapered fluid flow channel is greater than the depth of the second end of the tapered fluid flow channel.

4. The support structure of claim 1, wherein the area of the cross section of the first end of the tapered fluid flow channel is greater than the area of the cross section of the second end of the tapered fluid flow channel.

5. The support structure of claim 1, wherein the top section of the fluid flow channel comprises an open part, the open part of the top section of the fluid flow channel defining the fluid outlet.

6. The support structure of claim 1, wherein the top section comprises a closed part, the closed part of the top section of the fluid flow channel being located proximal to the fluid inlet.

7. The support structure of claim 1, wherein substantially the whole of the top section of the fluid flow channel is open, such that it forms the fluid outlet.

8. The support structure of claim 1, wherein the width of the second end of the fluid outlet is greater than the width of the first end of the fluid outlet.

9. The support structure of claim 1, wherein the fluid outlet is substantially the same shape as the top section of the tapered fluid flow channel.

10. The support structure of claim 1, wherein the fluid flow channel comprises one or more fins.

11. The support structure of claim 10, wherein the, or each, fin is arranged substantially longitudinally from the first end of the tapered fluid flow channel to the second end of the tapered fluid flow channel.

12. The support structure of claim 10, wherein the, or each, fin is made from a resilient material such that the fins are configurable to provide support to the user.

13. The support structure of claim 1, wherein the support structure comprises a first fluid dispersion layer.

14. The support structure of claim 13, wherein the support structure is arranged such that fluid can flow from the fluid outlet through the first fluid dispersion layer.

15. The support structure of claim 13, wherein at least part of the first fluid dispersion layer is porous and at least part of the first fluid dispersion layer is non-porous, the porous part of the first fluid dispersion layer being configured to allow fluid to pass therethrough and the non-porous part of the first fluid dispersion layer being configured to mitigate or prevent the flow of fluid.

16. The support structure of claim 15, wherein the porous part of the first fluid dispersion layer and the fluid outlet at least partially overlap.

17. The support structure of claim 15, wherein the nonporous part of the first fluid dispersion layer is located on a lower region of the first fluid dispersion layer.

18. An apparatus for providing fluid to a support structure for supporting the body of a user, the apparatus comprising:
a support structure for supporting the user, the support structure comprising:
a fluid flow channel, the fluid flow channel comprising:
a fluid inlet configured to direct fluid flow in a first direction; and
a top section comprising one or more apertures, the one or more apertures forming one or more fluid outlets in the top section, configured to direct fluid flow in a second direction, normal to the first direction;
wherein substantially the whole of the fluid flow channel is tapered, the tapered fluid flow channel comprising a first end and a second end;
the first end of the tapered fluid flow channel being located proximal to the fluid inlet and the second end of the tapered fluid flow channel being located distal to the fluid inlet;
wherein the width of the second end of the tapered fluid flow channel is greater than the width of the first end of the tapered fluid flow channel; and
wherein the, or each, fluid outlet comprises a first end located proximal to the fluid inlet and a second end located distal to the fluid inlet.

19. An apparatus for controlling the temperature of a support structure for supporting the body of a user, the apparatus comprising:
a support structure for supporting the user, the support structure comprising:
a fluid flow channel, the fluid flow channel comprising:
a fluid inlet configured to direct fluid flow in a first direction; and
a top section comprising one or more apertures, the one or more apertures forming one or more fluid outlets in the top section, configured to direct fluid flow in a second direction, normal to the first direction;
wherein substantially the whole of the fluid flow channel is tapered, the tapered fluid flow channel comprising a first end and a second end;
the first end of the tapered fluid flow channel being located proximal to the fluid inlet and the second end of the tapered fluid flow channel being located distal to the fluid inlet;
wherein the width of the second end of the tapered fluid flow channel is greater than the width of the first end of the tapered fluid flow channel; and
wherein the, or each, fluid outlet comprises a first end located proximal to the fluid inlet and a second end located distal to the fluid inlet.

* * * * *